United States Patent
Sujan et al.

(10) Patent No.: US 9,043,060 B2
(45) Date of Patent: May 26, 2015

(54) METHODS, SYSTEMS, AND APPARATUSES FOR DRIVELINE LOAD MANAGEMENT

(75) Inventors: Vivek Anand Sujan, Columbus, IN (US); Morgan MacKenzie Andreae, Columbus, IN (US); Martin T. Books, Columbus, IN (US); Xi Wei, Asbury, IA (US); Terrence Shaw, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 13/342,800

(22) Filed: Jan. 3, 2012

(65) Prior Publication Data
US 2012/0232730 A1 Sep. 13, 2012

Related U.S. Application Data

(60) Provisional application No. 61/428,902, filed on Dec. 31, 2010.

(51) Int. Cl.
*B60W 10/08* (2006.01)
*B60W 10/26* (2006.01)
*B60W 20/00* (2006.01)
(Continued)

(52) U.S. Cl.
CPC ............ *B60W 10/06* (2013.01); *B60W 10/08* (2013.01); *B60W 10/26* (2013.01); *B60W 20/104* (2013.01); *B60W 50/0097* (2013.01); *B60W 2050/0039* (2013.01); *B60W 2050/0057* (2013.01); *B60W 2510/244* (2013.01); *B60W 2510/248* (2013.01); *B60W 2530/14* (2013.01); *B60W 2550/402* (2013.01); *B60W 2710/0666* (2013.01); *B60W 2710/1005* (2013.01); *B60W 2710/244* (2013.01); *B60W 2720/106* (2013.01); *Y02T 10/6291* (2013.01); *Y02T 10/84* (2013.01); *B60Y 2304/05* (2013.01); *B60Y 2304/00* (2013.01)

(58) Field of Classification Search
CPC .. B60W 10/08; B60W 10/26; B60W 50/0097
USPC ................ 701/22; 307/9.1; 320/125; 91/408; 180/65.25; 60/286; 700/300
See application file for complete search history.

(56) References Cited

U.S. PATENT DOCUMENTS

| | | | |
|---|---|---|---|
| 3,566,717 | A | 3/1971 | Berman et al. |
| 3,732,751 | A | 5/1973 | Berman et al. |
| 3,923,115 | A | 12/1975 | Helling |

(Continued)

FOREIGN PATENT DOCUMENTS

| | | |
|---|---|---|
| CN | 201010610798.3 | 6/2011 |
| JP | 58098659 | 6/1983 |

(Continued)

*Primary Examiner* — Fadey Jabr
*Assistant Examiner* — Aaron L Troost
(74) *Attorney, Agent, or Firm* — Krieg DeVault LLP

(57) ABSTRACT

A system includes a hybrid drive system having an internal combustion engine and a non-combustion motive power source. The system includes an energy storage system and a controller. The controller is structured to functionally execute operations to improve an efficiency of they hybrid drive system. The controller interprets duty cycle data, a boundary condition, and an optimization criterion. The controller further elects a load response operating condition in response to the duty cycle data, the boundary condition, and the optimization criterion. The controller adjusts the operation of the engine and/or the motive power source in response to the elected load response operating condition.

29 Claims, 8 Drawing Sheets

(51) Int. Cl.
*B60W 50/00* (2006.01)
*B60W 10/06* (2006.01)

(56) References Cited

U.S. PATENT DOCUMENTS

| | | | |
|---|---|---|---|
| 4,021,677 A | 5/1977 | Rosen et al. | |
| 4,099,589 A | 7/1978 | Williams | |
| 4,165,795 A | 8/1979 | Lynch et al. | |
| 4,233,858 A | 11/1980 | Rowlett | |
| 4,305,254 A | 12/1981 | Kawakatsu et al. | |
| 4,335,429 A | 6/1982 | Kawakatsu | |
| 4,405,029 A | 9/1983 | Hunt | |
| 4,407,132 A | 10/1983 | Kawakatsu et al. | |
| 4,438,342 A | 3/1984 | Kenyon | |
| 4,489,242 A | 12/1984 | Worst | |
| 4,588,040 A | 5/1986 | Albright, Jr. et al. | |
| 5,251,588 A | 10/1993 | Tsujii et al. | |
| 5,255,733 A | 10/1993 | King | |
| 5,323,868 A | 6/1994 | Kawashima | |
| 5,327,992 A | 7/1994 | Boll | |
| 5,358,317 A | 10/1994 | Cikanek | |
| 5,403,244 A | 4/1995 | Tankersley et al. | |
| 5,428,274 A | 6/1995 | Furutani et al. | |
| 5,433,282 A | 7/1995 | Moroto et al. | |
| 5,492,189 A | 2/1996 | Kriegler et al. | |
| 5,513,719 A | 5/1996 | Moroto et al. | |
| 5,531,285 A | 7/1996 | Green | |
| 5,558,173 A | 9/1996 | Sherman | |
| 5,558,595 A | 9/1996 | Schmidt et al. | |
| 5,562,565 A | 10/1996 | Moroto et al. | |
| 5,635,805 A | 6/1997 | Ibaraki et al. | |
| 5,643,119 A | 7/1997 | Yamaguchi et al. | |
| 5,650,931 A * | 7/1997 | Nii | 701/22 |
| 5,664,635 A | 9/1997 | Koga et al. | |
| 5,713,425 A | 2/1998 | Buschhaus et al. | |
| 5,722,502 A | 3/1998 | Kubo | |
| 5,755,303 A | 5/1998 | Yamamoto et al. | |
| 5,762,156 A | 6/1998 | Bates et al. | |
| 5,775,449 A | 7/1998 | Moroto et al. | |
| 5,778,326 A * | 7/1998 | Moroto et al. | 701/22 |
| 5,788,006 A | 8/1998 | Yamaguchi | |
| 5,789,881 A | 8/1998 | Egami et al. | |
| 5,832,396 A | 11/1998 | Moroto et al. | |
| 5,845,731 A | 12/1998 | Buglione et al. | |
| 5,846,155 A | 12/1998 | Taniguchi et al. | |
| 5,864,771 A | 1/1999 | Yokoyama et al. | |
| 5,865,263 A | 2/1999 | Yamaguchi et al. | |
| 5,892,346 A | 4/1999 | Moroto et al. | |
| 5,898,282 A | 4/1999 | Drozdz | |
| 5,908,077 A | 6/1999 | Moore | |
| 5,924,406 A | 7/1999 | Kinugasa et al. | |
| 5,971,092 A | 10/1999 | Walker | |
| 5,995,895 A | 11/1999 | Watt et al. | |
| 6,009,365 A | 12/1999 | Takahara et al. | |
| 6,019,699 A | 2/2000 | Hoshiya et al. | |
| 6,026,921 A | 2/2000 | Aoyama et al. | |
| 6,032,869 A | 3/2000 | Ito et al. | |
| 6,070,650 A | 6/2000 | Inoue et al. | |
| 6,222,345 B1 | 4/2001 | Yamanashi | |
| 6,223,842 B1 | 5/2001 | Masaki | |
| 6,223,846 B1 | 5/2001 | Schechter | |
| 6,242,873 B1 * | 6/2001 | Drozdz et al. | 318/139 |
| 6,251,042 B1 | 6/2001 | Peterson et al. | |
| 6,300,763 B1 | 10/2001 | Kwok | |
| 6,300,858 B1 | 10/2001 | Kalapodis et al. | |
| 6,301,529 B1 | 10/2001 | Itoyama et al. | |
| 6,334,079 B1 | 12/2001 | Matsubara et al. | |
| 6,370,472 B1 | 4/2002 | Fosseen | |
| 6,374,780 B1 | 4/2002 | Rutyna et al. | |
| 6,404,636 B1 | 6/2002 | Staggers et al. | |
| 6,452,286 B1 | 9/2002 | Kubo et al. | |
| 6,464,028 B1 | 10/2002 | Imani | |
| 6,470,983 B1 | 10/2002 | Amano et al. | |
| 6,487,477 B1 | 11/2002 | Woestman et al. | |
| 6,500,089 B2 | 12/2002 | Lasson et al. | |
| 6,501,190 B1 | 12/2002 | Seguchi et al. | |
| 6,515,872 B2 | 2/2003 | Nakayama et al. | |
| 6,570,749 B1 | 5/2003 | Ling et al. | |
| 6,573,687 B2 | 6/2003 | Kimura et al. | |
| 6,598,496 B2 | 7/2003 | Pannell | |
| 6,647,961 B2 | 11/2003 | Suzuki et al. | |
| 6,648,086 B1 * | 11/2003 | Schulte | 180/65.25 |
| 6,668,953 B1 | 12/2003 | Reik et al. | |
| 6,725,679 B2 | 4/2004 | Itoh et al. | |
| 6,807,931 B2 | 10/2004 | Taylor et al. | |
| 6,832,148 B1 | 12/2004 | Bennett et al. | |
| 6,863,139 B2 | 3/2005 | Egami et al. | |
| 6,887,180 B2 | 5/2005 | Pels et al. | |
| 6,915,629 B2 | 7/2005 | Szymkowicz | |
| 6,928,807 B2 | 8/2005 | Jacob et al. | |
| 6,944,532 B2 | 9/2005 | Bellinger | |
| 7,024,858 B2 | 4/2006 | Gray, Jr. | |
| 7,104,920 B2 | 9/2006 | Beaty et al. | |
| 7,114,585 B2 | 10/2006 | Man et al. | |
| 7,119,454 B1 | 10/2006 | Chiao | |
| 7,188,020 B2 | 3/2007 | Yasui et al. | |
| 7,201,095 B2 * | 4/2007 | Hughey | 91/408 |
| 7,276,815 B2 | 10/2007 | Algrain et al. | |
| 7,303,504 B2 | 12/2007 | Uchisasai et al. | |
| 7,347,168 B2 | 3/2008 | Reckels et al. | |
| 7,360,615 B2 | 4/2008 | Salman et al. | |
| 7,370,612 B2 | 5/2008 | Hanai | |
| 7,391,129 B2 | 6/2008 | Chiao et al. | |
| 7,392,871 B2 | 7/2008 | Severinsky et al. | |
| 7,411,312 B2 | 8/2008 | Chiao | |
| 7,424,868 B2 | 9/2008 | Reckels et al. | |
| 7,448,458 B2 | 11/2008 | Meyer | |
| 7,455,134 B2 | 11/2008 | Severinsky et al. | |
| 7,492,055 B2 | 2/2009 | Chiao | |
| 7,520,353 B2 | 4/2009 | Severinsky et al. | |
| 7,532,960 B2 | 5/2009 | Kumar | |
| 7,568,539 B2 | 8/2009 | Abe et al. | |
| 7,572,201 B2 | 8/2009 | Supina et al. | |
| 7,578,363 B2 | 8/2009 | Kim | |
| 7,582,034 B2 | 9/2009 | Usoro | |
| 7,582,980 B2 | 9/2009 | Motoike et al. | |
| 7,715,958 B2 | 5/2010 | Kumar | |
| 7,715,971 B2 | 5/2010 | Okuda et al. | |
| 7,774,109 B2 | 8/2010 | Bajwa | |
| 8,234,025 B2 | 7/2012 | Conlon et al. | |
| 2003/0116368 A1 | 6/2003 | Winkelman et al. | |
| 2006/0101809 A1 | 5/2006 | Bodo et al. | |
| 2007/0112475 A1 | 5/2007 | Koebler et al. | |
| 2007/0219045 A1 | 9/2007 | Ogata et al. | |
| 2007/0225888 A1 | 9/2007 | Morris | |
| 2007/0245737 A1 | 10/2007 | Inaba et al. | |
| 2007/0289291 A1 | 12/2007 | Rabinovich et al. | |
| 2007/0298928 A1 | 12/2007 | Yamanaka et al. | |
| 2008/0021628 A1 | 1/2008 | Tryon | |
| 2008/0027639 A1 | 1/2008 | Tryon | |
| 2008/0039263 A1 | 2/2008 | Usoro | |
| 2008/0051242 A1 | 2/2008 | Usoro | |
| 2008/0076629 A1 | 3/2008 | Sugai et al. | |
| 2008/0099256 A1 | 5/2008 | Holmes et al. | |
| 2008/0103635 A1 * | 5/2008 | Vuk et al. | 700/300 |
| 2008/0103679 A1 | 5/2008 | Ruiz | |
| 2008/0110439 A1 | 5/2008 | Sugimoto | |
| 2008/0120175 A1 * | 5/2008 | Doering | 705/14 |
| 2008/0135314 A1 | 6/2008 | Motoike et al. | |
| 2008/0236921 A1 | 10/2008 | Huseman | |
| 2008/0242498 A1 | 10/2008 | Miller et al. | |
| 2008/0243346 A1 | 10/2008 | Huseman | |
| 2008/0251303 A1 | 10/2008 | Rouaud et al. | |
| 2008/0257311 A1 | 10/2008 | Spicer et al. | |
| 2008/0300743 A1 * | 12/2008 | Conlon et al. | 701/22 |
| 2009/0115491 A1 | 5/2009 | Anwar et al. | |
| 2009/0118090 A1 | 5/2009 | Heap et al. | |
| 2009/0118969 A1 | 5/2009 | Heap et al. | |
| 2009/0188450 A1 | 7/2009 | Kline et al. | |
| 2009/0195203 A1 | 8/2009 | Yurgil | |
| 2009/0197727 A1 | 8/2009 | Janson | |
| 2009/0197728 A1 | 8/2009 | Janson | |
| 2009/0199553 A1 | 8/2009 | Nishimura et al. | |
| 2009/0200094 A1 | 8/2009 | Zohrer et al. | |

(56) References Cited

U.S. PATENT DOCUMENTS

| | | |
|---|---|---|
| 2009/0200095 A1 | 8/2009 | Kawasaki |
| 2009/0205886 A1 | 8/2009 | Supina et al. |
| 2009/0209146 A1 | 8/2009 | Jegel |
| 2009/0209381 A1 | 8/2009 | Ai et al. |
| 2009/0221390 A1 | 9/2009 | Houle |
| 2009/0223727 A1 | 9/2009 | Tolksdorf |
| 2009/0324453 A1 | 12/2009 | Harinath et al. |
| 2010/0019726 A1* | 1/2010 | Kumar .................. 320/125 |
| 2010/0030437 A1 | 2/2010 | Kim et al. |
| 2010/0043404 A1* | 2/2010 | Hebbale et al. ........... 60/286 |
| 2010/0065357 A1 | 3/2010 | Oyama et al. |
| 2010/0070120 A1 | 3/2010 | Bailey et al. |
| 2010/0100263 A1 | 4/2010 | Aoki et al. |
| 2010/0222949 A1 | 9/2010 | Muta |
| 2011/0004364 A1 | 1/2011 | Sawada et al. |
| 2012/0319471 A1* | 12/2012 | Miller .................... 307/9.1 |

FOREIGN PATENT DOCUMENTS

| | | |
|---|---|---|
| JP | 10304511 | 11/1998 |
| JP | 2007032494 | 2/2007 |
| WO | 2008109215 A2 | 9/2008 |
| WO | 2008128416 A1 | 10/2008 |

\* cited by examiner

METHODS, SYSTEMS, AND APPARATUSES FOR DRIVELINE LOAD MANAGEMENT

CROSS-REFERENCE TO RELATED APPLICATIONS

The present application claims the benefit of U.S. Provisional Patent Application No. 61/428,902, filed Dec. 31, 2010, which is incorporated herein by reference for all purposes.

BACKGROUND

The present application relates to managing a driveline load strategy, and more particularly, but not exclusively to improve fuel economy through driveline load management. Present approaches to driveline load management suffer from a variety of limitations and problems including those respecting driver interaction and desires regarding fuel efficiency, travel time and non-driver imposed conditions. There is a need for the unique and inventive methods, systems and apparatuses for driveline load management disclosed herein.

SUMMARY

One embodiment of the present invention is a unique driveline load management system. Other embodiments include unique methods, devices, and apparatuses to manage driveline load. Further embodiments, forms, objects, features, advantages, aspects, and benefits shall become apparent from the following description and drawings.

DETAILED DESCRIPTION

Figure 1:
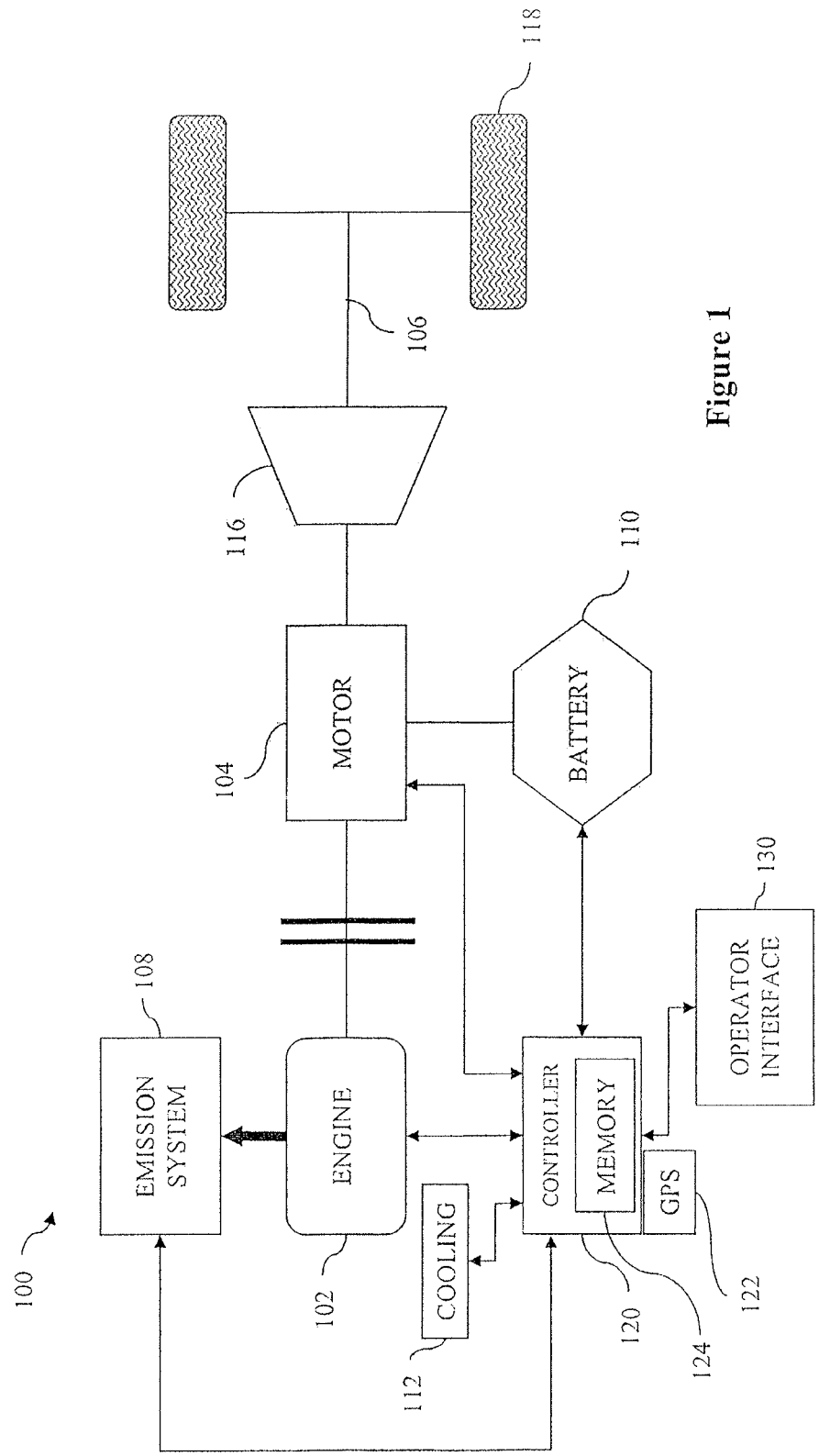
FIG. 1 is a schematic illustration of a vehicle including an exemplary driveline load management system.

For purposes of promoting an understanding of the principles of the invention, reference will now be made to the exemplary embodiments illustrated in the figures and specific language will be used to describe the same. It will nevertheless be understood that no limitation of the scope of the invention is thereby created, and that the invention includes and protects such alterations and modifications to the illustrated embodiments, and such further applications of the principles of the invention illustrated therein as would occur to one skilled in the art to which the invention relates.

Reduction in pollution and improvement in fuel economy has driven a demand in improving fuel consumption of automobiles and trucks in certain applicaitons. Low fuel efficiency and high annual fuel consumption properties of vehicles, such as line-haul Class 8 truck applications, hold substantial promise for fuel economy benefits even if a small percent improvement in fuel consumption can be obtained. These vehicles often drive over varying terrain grade, requiring substantial use of throttle and brake behaviors. Kinetic and potential energy is lost during these transitions which results in added fuel consumption. Hybrid powertrain applications including both an internal combustion engine and an electric motor can capture and return of at least some lost kinetic and potential energy. A driveline load management strategy of one embodiment of the present invention may be employed substantially in a hybridized vehicle using a parallel hybrid architecture to improve fuel consumption of vehicles such as line-haul Class 8 trucks.

A further embodiment includes: providing a driveline load management system including a hybrid drive system having a fuel-driven motive power source, an electric motive power source, and an energy storage system; providing a hybrid controller structured to receive operator interface data, geographical position data, past duty cycle data and operating conditions data; determining an anticipated driveline load duty cycle in response to operator interface data, the geographical position data, the past duty cycle data and the operating conditions data; selecting a current operating mode in response to the anticipated driveline load duty cycle; and providing one or more current operating parameters in response to the current operating mode.

Still a further embodiment of the present invention includes a system for driveline load management within a hybrid drive system of a line haul truck. A system of one embodiment may provide responses in driveline operation mode based on upcoming conditions. Driveline operations may include, but are not limited to, a cooling system, an internal combustion engine, a regenerative braking system, an emission system and combinations thereof. The upcoming conditions may include, but are not limited to, a hill, a slope, a grade, a stop and combinations thereof.

In another embodiment, the hybrid drive system may include a parallel pre-transmission architecture acting to supplement a primary fuel-driven engine power with electrical motive power. The energy may be drawn out and stored in an energy storage system or a battery during braking events. The energy may subsequently be provided during an engine loading event such as an incline if the state of charge of an energy storage system is above a threshold such as greater than 0%. Torque requirements of engine loading events may be met by the engine up to an engine power threshold and attempts may be made to maintain engine operation on an efficiency line as it provides its power output through power from an energy storage system supplying energy to the electrical motive power source.

In yet another embodiment of the present invention, the hybrid system may produce an operating condition based on an anticipated duty cycle. Operating condition responses may include a regenerative brake operation in which energy is captured; a preparation operation in which the battery is unload by boosting the engine or by reducing the torque contribution of the engine and supplementing with the motor; a boost operation to aid in an incline assent; a start-stop operation which includes an energy capture and return contained module; and a speed regulation operation such as a system generated cruise control before the next operation mode.

For one aspect of such an architecture, intelligent algorithms allow the capture and storage of kinetic energy from a driveline during variations in a duty cycle such as terrain grade variation and start-stop frequency. Storage of captured energy or regenerated potential may be accomplished using a variety of storage mechanisms such as chemical (batteries, ultra-capacitors, etc.), fluidic (pneumatic, hydraulic reservoirs, etc.), mechanical (flywheels, etc.), and others. Captured energy may then be returned to the driveline during portions of a duty cycle when, for example, acceleration is required by variations in travel conditions such as an ascent of a hill or a launch following a stop. Intelligent energy capture-and-return from a driveline load management strategy allows driveline operating conditions with lower fuel consumption and reduced driver related losses. Given a relative variation in terrain grade, there may be a potential fuel consumption benefit in using a driveline load management system for a parallel hybrid system with energy storage capabilities.

Referencing FIG. 1, still a further embodiment is depicted as hybrid system 100. System 100 includes driveline load management of a hybrid powertrain. Hybrid powertrain has a fuel-driven motive power source 102 and an electrical motive power source 104 each capable of contributing to vehicular propulsion. Hybrid powertrain illustrated in FIG. 1 is configured with a parallel arrangement, where a fuel-driven motive power source 102, an electrical motive power source 104, or both may apply torque to a driveline 106 to propel a vehicle or otherwise meet a load demand. However, hybrid powertrain may be any arrangement understood in the art that is at least partially parallel, including without limitation parallel or series-parallel architectures. In the depicted system 100, fuel-driven motive power source 102 is a form of reciprocating piston internal combustion engine, and more particularly is of a diesel-fueled reciprocating piston engine. Also, the depicted system 100 more particularly includes an electrical motor/generator form of electrical motive power source 104. However, it should be understood that other embodiments of the present invention may have a different type of fuel-driven motive power source 102 and/or electrical motive power source 104.

Driveline 106 is mechanically coupled to fuel-driven motive power source 102 and electrical motive power source 104. In the arrangement illustrated in FIG. 1, a component 116 receives power input from fuel-driven motive power source 102 and/or electrical motive power source 104, and can further provide power to power sources 102, 104, for example to charge an energy storage system 110 through a regenerative braking system or re-start fuel-driven motive power source 102 during driveline operation. Component 116 of hybrid powertrain as shown may include without limitation a fully automatic, semiautomatic, or manual transmission, a torque converter, a gear splitter, a differential, a deep reduction gear, one or more clutches, and/or any other device known in the art that is in the torque path between either of power sources 102, 104 and a final load 118. In the depicted arrangement, energy storage system 110 is in the form of at least one battery containing multiple electrochemical cells to store electrical energy, and load 118 is in the form of traction wheels to propel an on-road or off-road form of vehicle. Alternatively or additionally, fluid-based (pneumatic and/or hydraulic) energy storage, mechanical energy storage (such as a flywheel to store energy kinetically), and/or energy management in the form of waste heat recovery can be used, to name just a few examples.

In hybrid system 100, several operating modes exist. Regenerative brakes may be charging energy storage system 110 during a downhill or coasting event. Electrical motive power source 104 may be providing a boost to driveline 106 during an incline, for example, if a condition, such as the State of Charge (SOC) of battery>0% for energy storage system 110 exists. Fuel-driven motive power source 102 may be operated to meet torque requirements up to an engine power threshold. Electrical motive power source 104 may supplement with a boost to driveline 106.

Each operating mode may have efficiency limitations in response to geographical position and upcoming conditions. System 100 may be capable of determining an increased fuel efficient travel line for such conditions. When system performance is determined to further benefit from system capabilities, performance requirements of some or all the equipment can be reduced, such that overdesign of the same for peak performance can be avoided.

Fuel-driven motive power source 102 may be configured with an emission system 108 to handle exhaust gases produced during the operation of fuel-driven motive power source 102. Exhaust gases are conditioned within emission system 108 to remove substances such as $NO_x$, $SO_x$, soot or the like. Hybrid system 100 may also be configured with a cooling system 112 to provide thermal management for various components such as fuel-driven motive power source 102, energy storage system 110, electrical motive power source 104, emissions system 108, a passenger compartment (not shown) or the like.

A hybrid controller 120 operates to coordinate the operation of both power sources 102, 104, energy storage system 110, cooling system 112, emission system 108, and other such subsystems. Controls for these subsystems may be physically combined in any combination or stand as separate units. Single hybrid controller 120 is shown for ease of description. Controller 120 provides hardware and software for performing functions described herein. Controller 120 includes a Global Positioning System (GPS) subsystem 122 or known component for determining a position of vehicle along a route. Positioning signals may be utilized to improve hybridization benefits with driveline load management strategies. Fuel economy benefits may be realized by using a positioning system such as a GPS and computerized terrain maps to help predict upcoming engine load changes.

In another embodiment, system 100 may be able to exchange information with an operator. The system may be able to suggest preliminary operator behavior and provide feedback regarding desired efficiencies. In FIG. 1, controller 120 is connected to an operator interface 130 for providing information to an operator and, optionally, obtaining operator inputs. Operator interface 130 may be any known interface mechanism including, but not limited to, a monitor, a keyboard, a touch screen, a switch panel, a voice recognition system, an audible presentation system and combinations thereof.

Controller 120 of system 100 in FIG. 1 includes memory 124 as well as a number of inputs and outputs for interfacing with various sensors and systems. Controller 120 can be an electronic circuit including of one or more components, having digital circuitry, analog circuitry, or both. Controller 120 may be a software and/or firmware programmable type; a hardwired, dedicated state machine; or a combination of these. In one embodiment, controller 120 is of a programmable microcontroller solid-state integrated circuit type that includes memory 124 and one or more central processing units. The memory 124 of controller 120 may be comprised of one or more components and may be of any volatile or nonvolatile type, including the solid-state variety, the optical media variety, the magnetic variety, a combination of these, or other types of memory.

Controller 120 may be dedicated to the control of just the operations described herein or to sub controlled aspects of system 100. In any case, controller 120 preferably includes one or more control algorithms defined by operating logic in the form of software instructions, firmware instructions, dedicated hardware, or the like. These algorithms will be described in greater detail hereinafter, for controlling operation of various aspects of system 100.

An embodiment of the present invention may include a method where data is received and provided to an anticipating module in a controller. The anticipating module produces an operating mode by which the controller operates the system. The operating mode may include an engine with or without a torque assist, a driveline with or without regenerative braking, a cooling system engaged or not engaged, and an emission system relating to temperature, dosing of an emission system or the like. Yet a further embodiment includes a method comprising: receiving operating data and forecasting a driveline load performance characteristic. The forecast may be used by controller 120 to anticipate a capture or return event. The forecast is evaluated for possible operation mode modifications to improve a selected performance characteristic. System 100 is then operated to participate in the capture event. The method of this embodiment may continue to monitor the performance characteristic and monitor the forecast based on position. With one aspect of the present invention, system 100 may forgo modes triggered by subsystems such as the emission system if a driveline operation such as, but not limited to, engine performance is approaching a condition change.

Figure 2:
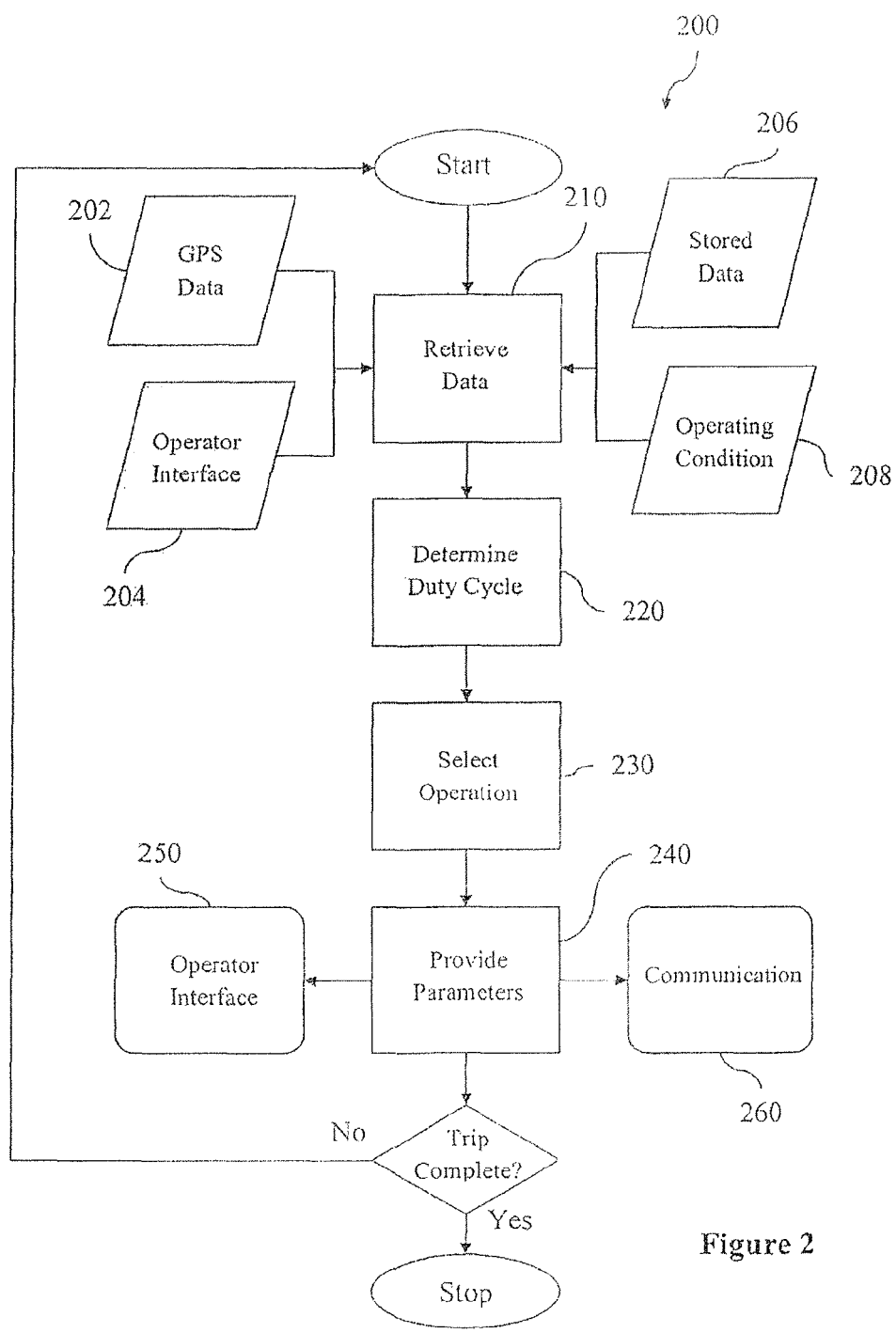
FIG. 2 is a flowchart illustrating an exemplary control procedure for initiating a driveline load management procedure.

FIG. 2 is a flowchart illustrating an exemplary driveline load management procedure 200. The operating logic of controller 120 is structured to perform operations of procedure 200 as appropriate. Module 210 is a data retrieving module which may retrieve data from a GPS module 202, an operator interface module 204, a stored data module 206, an operating condition module 208 or combinations thereof. The GPS module 202 may include absolute position or predictive data regarding a travel line such as hills, slopes, stops, speed and other terrain characteristics along the route.

Operator interface module 204 may include a preference selection such as increased fuel economy mode, reduced travel time mode, cruise control mode, and route characteristic mode such as highway or city routes. Operator interface module 204 may also include other goals/targets such as, but not limited to, noise reduction, speed regulation, and emission profiles. Such goals/targets may come from a fleet owner policy or municipal regulation to name just a couple of examples.

Stored data module 206 may include stored information regarding terrain profiles and past duty cycles as well as future route data and operator preferences. Operating condition module 208 may include acceleration torque request, deceleration torque request, vehicle speed, system temperatures, emission system status, travel duration and the like. One embodiment of the present invention may include module 210 receiving operating data such as, but not limited to, regeneration activation, downgrade slope, low state of charge, efficiency mode and the like.

Module 210 retrieves data from modules 202, 204, 206, and 208 and procedure 200 proceeds to module 220 which estimates duty cycle. Module 220 determines an anticipated duty cycle in response to the data retrieved in module 210. The anticipated duty cycle may include road characteristics, landscape features, ascents, descents, route imposed characteristics and the like. The anticipated duty cycle may be near term in relation to time or distance. With anticipated duty cycles, calculations for converting a dynamic force to energy may be applied to the operating parameters of a hybrid system.

Figure 5:
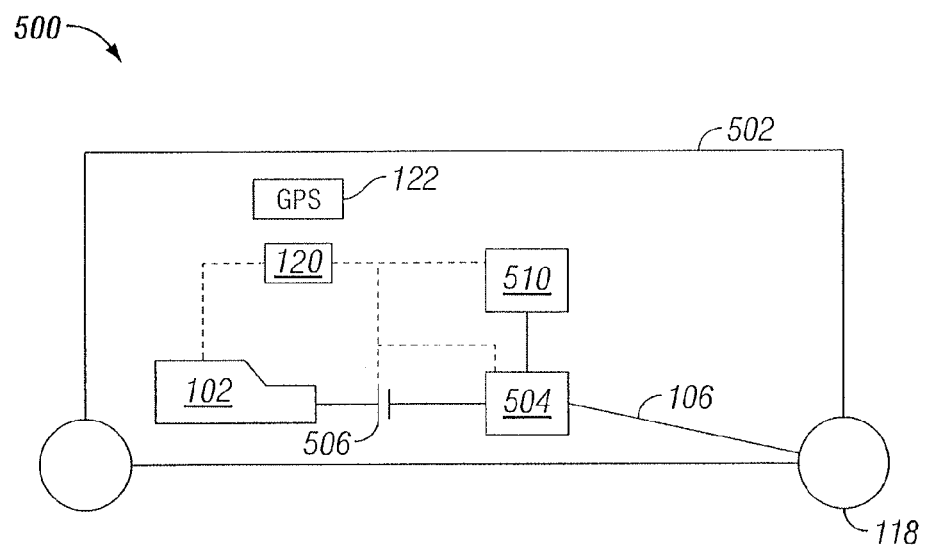
FIG. 5 is a schematic diagram of a system for improving a hybrid drive system efficiency.

Referring additionally to FIG. 5, the power requirements of a particular route may be modeled as a function of amplitude (A) and wavelength (λ) with respect to vertical (y(m)) and horizontal (x(m)) axes. Based on this representation, several mathematical relationships arise as follows:

$$\tan(\theta) = \frac{dy}{dx} \qquad \text{Eq. 1}$$

$$y = A \cdot \sin\left[\frac{2\pi x}{\lambda}\right] \qquad \text{Eq. 2}$$

$$\theta = \operatorname{atan}\left[A\frac{2\pi}{\lambda}\cos\left[\frac{2\pi x}{\lambda}\right]\right] \qquad \text{Eq. 3}$$

$$P(x) = v \cdot m \cdot g \cdot \sin(\theta) \qquad \text{Eq. 4}$$

$$E_{decent} = \int P(x)dt = \int_{x=\lambda/4}^{\lambda 3/4} P(x)v^{-1}dx \qquad \text{Eq. 5}$$

$$E_{accent} = \int P(x)dt = \int_{x=-\lambda/4}^{\lambda/4} P(x)v^{-1}dx \qquad \text{Eq. 6}$$

Calculations may include determining the power required to maintain speed, determining a current power requirement, and/or executing an energy regeneration operation if the net power requirements are <0 kW. Available energy is the local potential energy change at each accent/decent. When vehicle kinetic energy is held constant, potential energy change is only a function of amplitude (A) and not wavelength (Λ).

Module 230 is a selection module which takes the retrieved data from module 210 and the anticipated duty cycle from module 220 to select an operating mode. The operating mode may include energy capture and storage, energy return, energy capture and return, energy storage adjustments, and performance control.

The operating mode provides input to module 240, which provides operating parameters in response to the operating mode selected in module 230. Providing the operating parameters in module 240 may include regeneration and storage commands for energy capture modes, boost or launch commands for energy return modes, start-stop commands for energy capture and return modes, boost or supplementation commands for energy storage adjustment, and cruise control allocation or integration commands for performance control modes. Module 240 may also contribute to module 250, an operator module, or module 260, a communication module.

Module 250 may deliver operator feedback including indication of ability to power with regenerative braking, warning against modification during an operating mode, or input regarding system override or operating targets. Operator behavior may also have an effect on fuel consumption. Operator behavior factors may include the amount and rate of deviation from a target speed as an operator fluctuates between acceleration and deceleration torque requests. Operator behavior may lead to more coasting, which results in fewer regenerative braking opportunities and therefore a reduced hybridization benefit.

Module 260 may provide communication with other controls including coordination of carrying out adaptations to the electric drive system and commanding a performance modification function. The driveline load management system of this embodiment may also make use of the cruise control mode allowing for small deviations from the target speed to harvest the energy in undulating road load conditions. A speed regulation operating mode considering an anticipated duty cycle may operate similar to a cruise governor for driveline load management.

Figure 3:
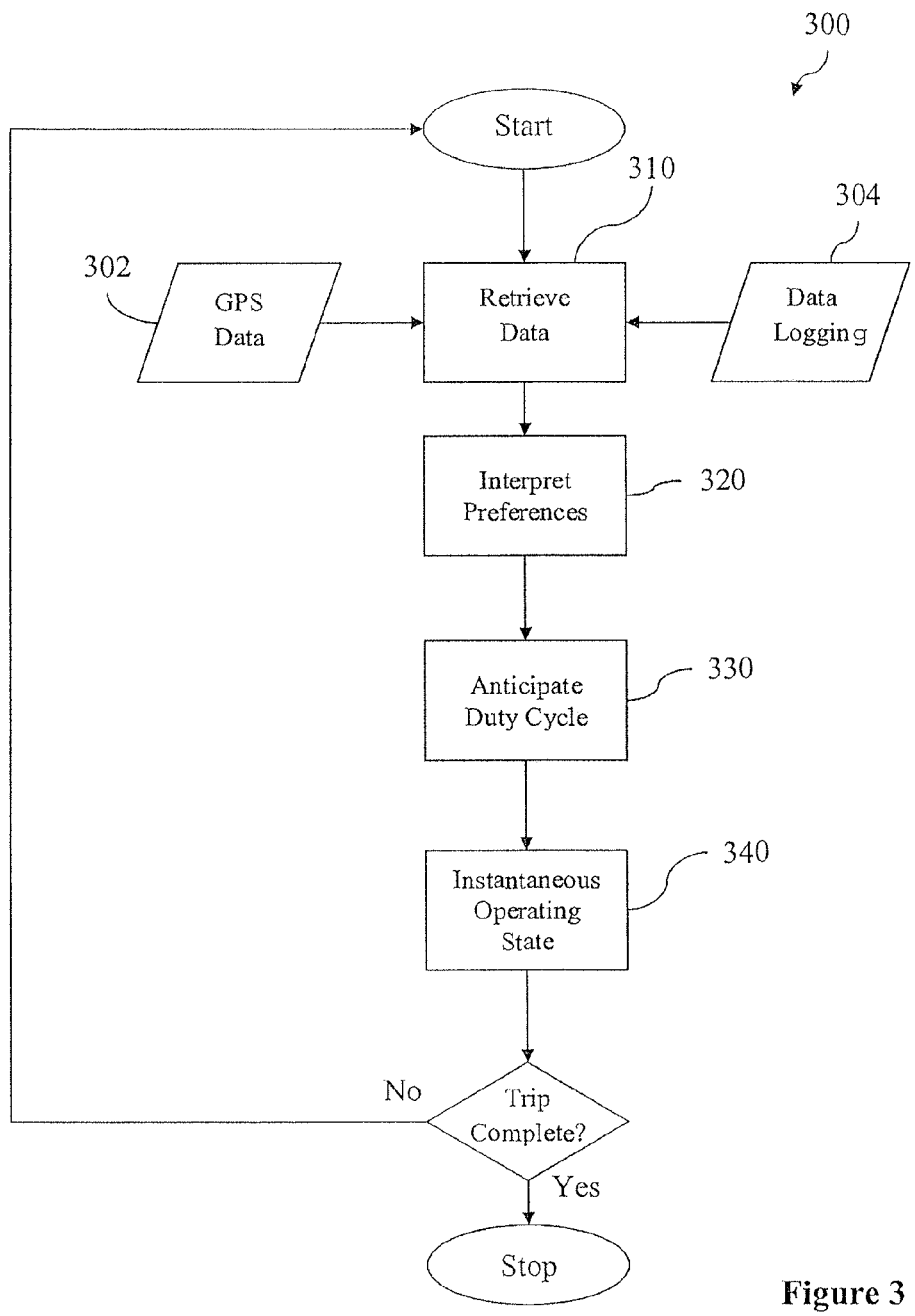
FIG. 3 is a flowchart illustrating an exemplary driveline load management procedure.

An exemplary duty cycle determination procedure 300 is shown in FIG. 3, which may be executed to implement module 220. Operating logic of controller 120 is structured to implement procedure 300 as applicable. Procedure 300 uses data logging apparatus 304 and satellite positioning equipment 302 among other input apparatus to retrieve data and inputs in module 310. The inputs of module 310 may be used to evaluate past duty cycles. Past duty cycles may then be interpreted in terms of driver preferences or expectations in module 320 for operating modes such as reducing time to destination, reducing fuel consumption, reducing exhaust gas emissions, selecting road characteristics such as highway versus city streets and the like. It should be appreciated that operating preferences may also be imposed by a non-driving vehicle owner or municipal regulation such as, but not limited to speed regulation, noise reduction, idling periods, and the like. The preferences are used in module 320.

With data logging and satellite positioning systems of the present invention, the engine control system may be able to anticipate a near-term future duty cycle event in module 330 such as, but not limited to, approaching a large hill, terrain characteristics like undulations and curves, braking limitations, start-stop frequencies, a speed-controlled area, or a weigh station.

The embodiment of the present invention in FIG. 3 allows the engine control system to determine a current operating state in module 340 for various subsystems of the hybrid drivetrain such as the fuel-driven motive power source, the electrical motive power source, the cooling system, the emission system, and the regenerative braking system. Operating states for other subsystems are contemplated. Engine controls according to the present invention may be tuned for current operating state for future events in module 340 to provide operating preferences.

In one exemplary embodiment, if a duty cycle includes an approaching hill, a doser fuel is not added to regenerate the emissions system in anticipation of the hill-climb which will create the necessary high temperature exhaust gases. In another example, as a vehicle approaches the crest of a hill, the current thermal inertia of the cooling system is applied to a calculation to determine whether the vehicle is able to crest the hill without turning on a cooling fan and not exceeding thermal limits. By anticipating the kinetic energy events in the near-term duty cycle, a control system is able to operate at the outer limits of the operating margins.

Operating modes with a lower speed at a high power may operate in a more efficient region while sacrificing vehicle speed. An operator may accept a drop in vehicle speed when on an uphill grade. Operating modes with increased speed at lower power may gain extra momentum to be used after the end of a downgrade segment. Bottom breakpoint has lower torque than that required on flat road. An operator may accept an increase in vehicle speed when on downhill grade.

Various embodiments of the present application use historic data, current position, operating condition, and anticipated future route data to determine a selected operating state of the engine, the driveline, the cooling system, and the emissions system—at one instant, and over the next interval of time. Control of operating states, tuned to the local and future operating conditions has the capability to reduce fuel consumption and emissions along with reductions of engine, cooling system, and emissions systems costs.

One exemplary aspect of the present application is a beneficial technique for providing energy savings and transfer for a line-haul truck over an undulating terrain which may also have the added benefit of extending the service brake life. As observed with varying terrain grade routes, operating modes that include throttling and braking back and forth are considered wasteful of energy (both fuel and kinetic energy) and may reduce the life of any component. Operating the vehicle with a driveline management system may reduce the wasted energy by anticipating throttle and brake demands and modifying operations accordingly.

Figure 4:
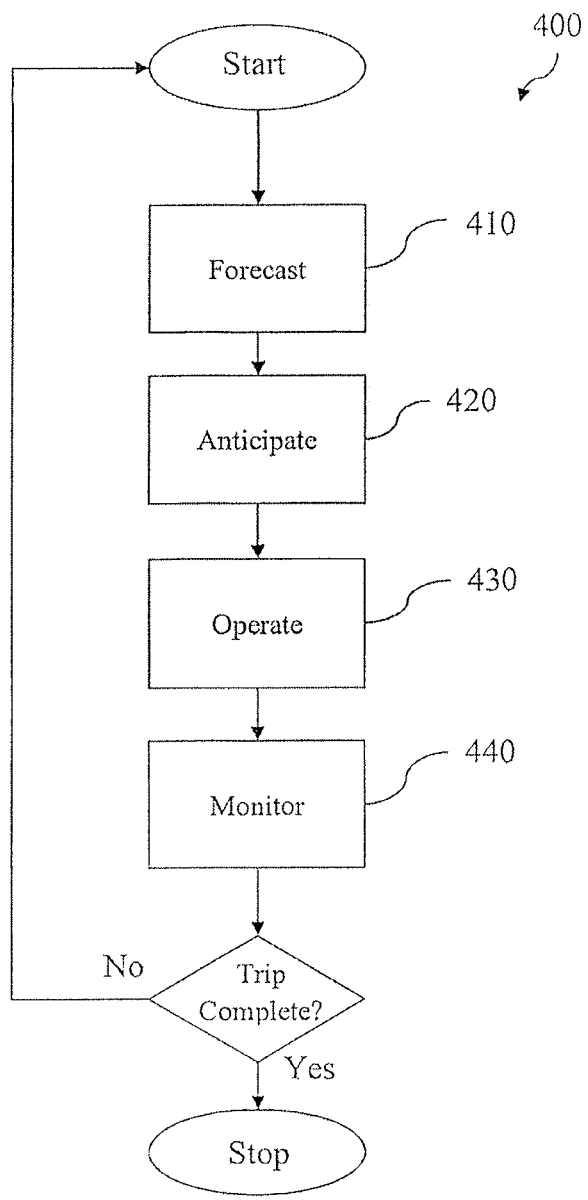
FIG. 4 is a flowchart illustrating another exemplary driveline load management procedure.

An exemplary driveline load management procedure 400 is shown in FIG. 4. Operating logic of controller 120 is structured to implement procedure 400 as applicable. Procedure 400 begins by receiving input such as navigation predictive data on the terrain of the travel route. Procedure 400 then forecasts in module 410 a driveline load profile which determines an anticipated sequence of driveline commands to improve operating conditions in module 420. Procedure 400 may then operate the anticipated sequence of driveline commands in module 430 which may include allowing a cruise control set point to float above and below predetermined or operator established limits. Procedure 400 continues to monitor the driveline load profile and operating conditions in module 440.

This aspect takes advantage of the engine system (and potential other systems such as a waste heat recovery system) to further increase the fuel economy of line-haul trucks. A driveline load management algorithm suited for a parallel hybrid driveline architecture may demonstrate hybridization benefits during varying road load conditions seen during a typical line-haul truck route. Another aspect of the present invention is to improve the hybridization potential due to local undulations (road harmonics) of a hybrid system's fuel economy.

Referencing FIG. 5, a system 500 includes a hybrid drive system having an internal combustion engine 102 and a non-combustion motive power source 504. The internal combustion engine 102 is any type of internal combustion engine known in the art. An example engine 102 is a diesel engine. The engine 102 may be a gasoline engine, natural gas engine, turbine engine, etc. The non-combustion motive power source 504 includes any non-combustion motive power source 504 known in the art. Example non-combustion motive power sources 504 include an electric motor, an electric motor-generator, an electric motor and electric generator as separate components, and a hydraulic motor. The internal combustion engine 102 and non-combustion motive power source 504 are motively coupled to a vehicle 502, for example with a driveline 106 coupled to a load 118 (e.g. one or more driving wheels).

The system 500 includes an energy storage system 510. The energy storage system 510 is operationally coupled to the non-combustion motive power source 504. Example energy storage systems 510 include a battery, a hyper-capacitor, a flywheel, and/or a hydraulic accumulator. The energy storage system 510 and the non-combustion motive power source 504 provide power to or receive power from the load 118. The energy storage system 510 provides power to the non-combustion motive power source 504 during periods where the non-combustion motive power source 504 is powering the load 118, and receives power from the non-combustion motive power source 504 during periods where the non-combustion motive power source 504 is recovering energy from the load 118.

In certain embodiments, the system includes the vehicle 502 having a gross vehicle weight rating that exceeds 26,000 pounds, where the engine 102 and the motive power source 504 are motively coupled to the vehicle 502. In certain embodiments, the system 500 includes at least one clutch 506 that selectively couples the engine 102 and/or the motive power source 504 to the vehicle 502, the coupling being either individually or in conjunction. In the example system 500, the clutch 506 selectively couples the engine 102 to the driveline 106, and the motive power source 504 includes an internal clutch (not shown) that selectively couples the motive power source 504 to the driveline 106. Accordingly, the system 500 allows either the engine 102, the motive power source 504, both, or neither, to be coupled to the driveline 106 in response to commands from the controller 120.

The system 500 further includes a controller 120 structured to functionally execute operations to improve the efficiency of the hybrid drive system. In certain embodiments, the controller 120 forms a portion of a processing subsystem including one or more computing devices having memory, processing, and communication hardware. The controller 120 may be a single device or a distributed device, and the functions of the controller 120 may be performed by hardware or software.

In certain embodiments, the controller 120 includes one or more modules structured to functionally execute the operations of the controller. In certain embodiments, the controller includes a workload definition module, an efficiency strategy module, and an efficiency implementation module. The description herein including modules emphasizes the structural independence of the aspects of the controller, and illustrates one grouping of operations and responsibilities of the controller. Other groupings that execute similar overall operations are understood within the scope of the present application. Modules may be implemented in hardware and/or software on computer readable medium, and modules may be distributed across various hardware or software components. More specific descriptions of certain embodiments of controller operations are included in the section referencing FIGS. 6 and 7.

Certain operations described herein include operations to interpret one or more parameters. Interpreting, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a computer readable medium, receiving the value as a run-time parameter by any means known in the art, and/or by receiving a value by which the interpreted parameter can be calculated, and/or by referencing a default value that is interpreted to be the parameter value.

Figure 6:
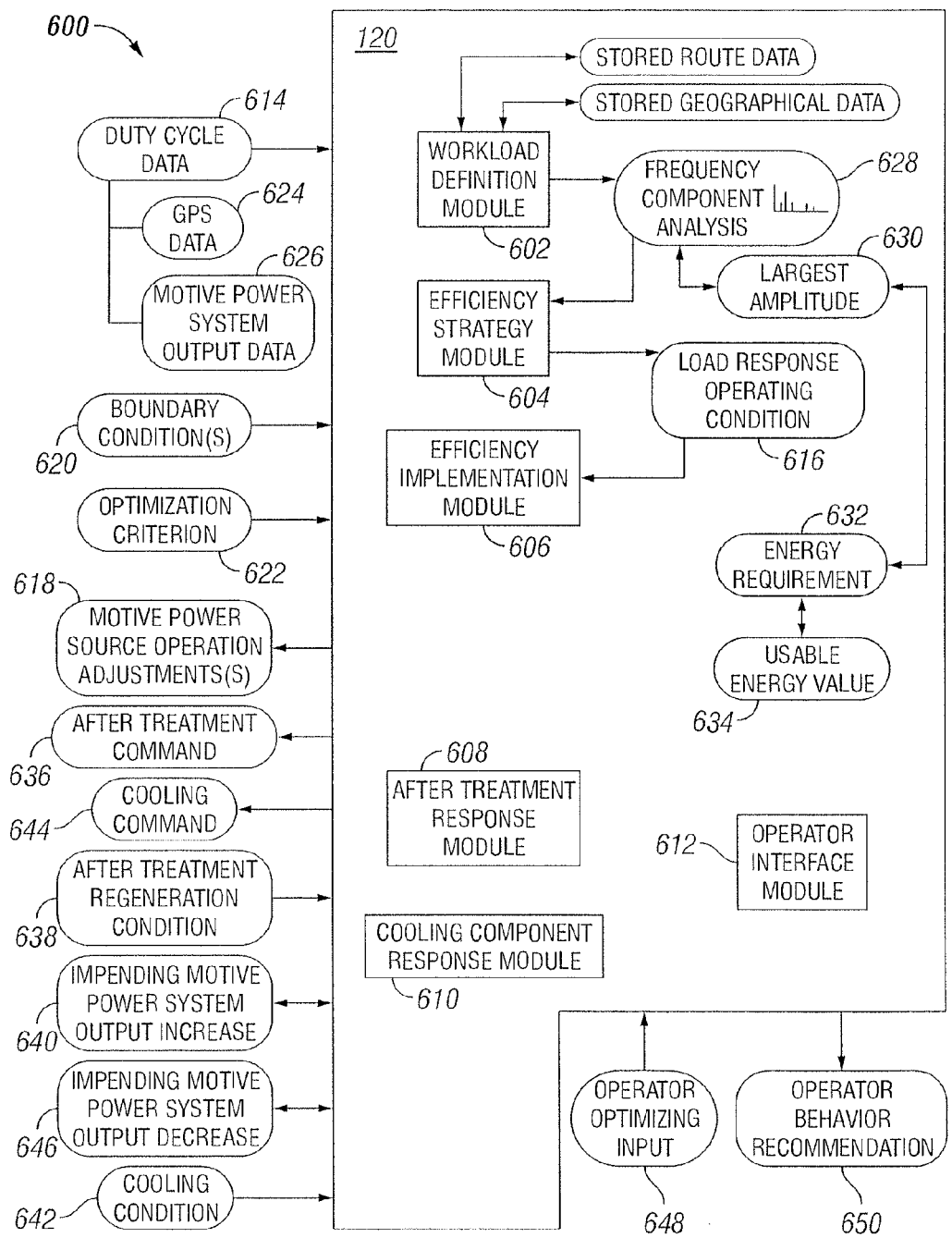
FIG. 6 is a schematic diagram of an apparatus for improving a hybrid drive system efficiency.
Figure 7:
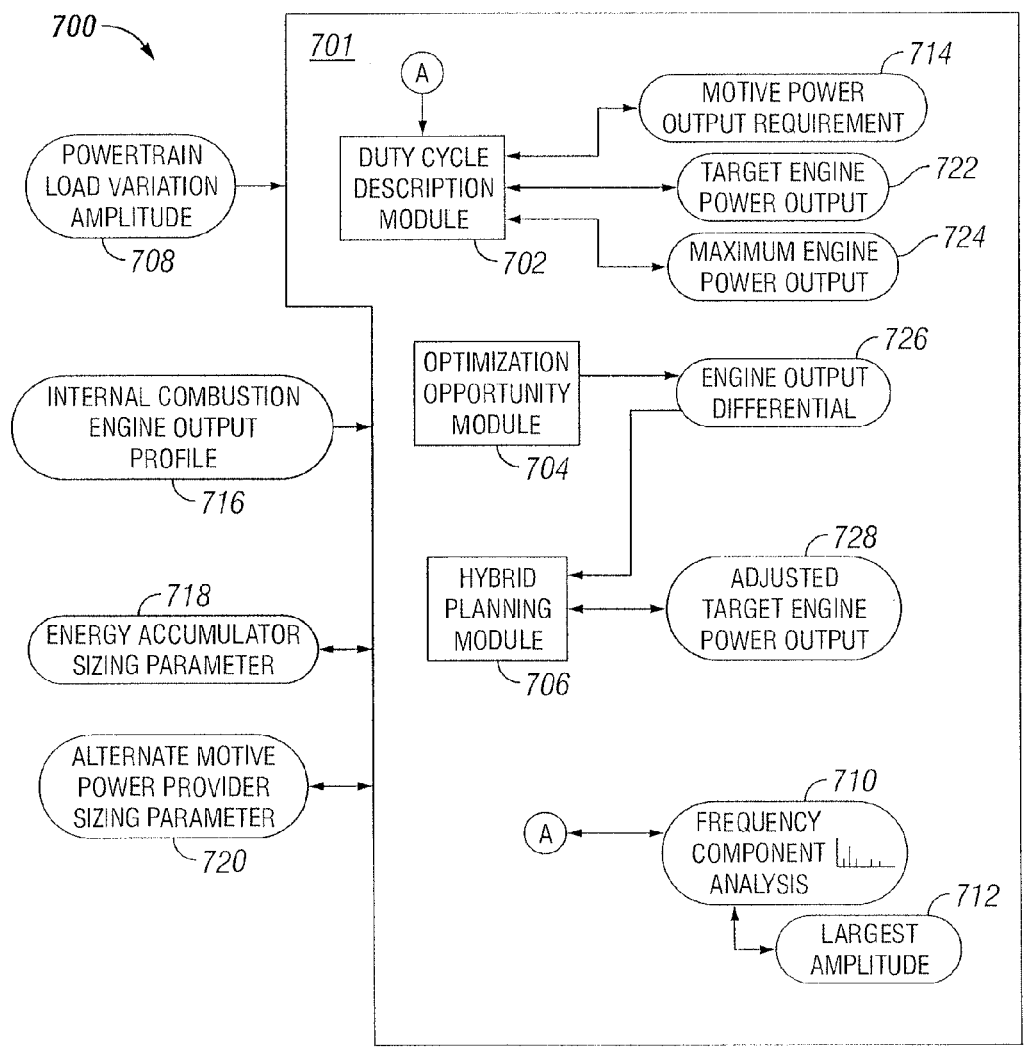
FIG. 7 is a schematic diagram of an apparatus for providing a hybrid drive system having improved efficiency.

Referencing FIG. 6, an apparatus 600 includes an example controller 120. The controller 120 includes a workload definition module 602 that interprets duty cycle data 614 for a motive power system for a vehicle having a plurality of motive power sources. Example duty cycle data 614 includes motive power system output data 626 taken over a relevant period, for example over a specified route and/or over a period of time (e.g. one day, three days, one week, etc.). The duty cycle data 614 may be simulated, modeled, estimated, and/or data taken during real-time operations. Example motive power system output data 626 includes power output data and/or torque output data. Motive power system output data 626 includes, in certain embodiments, all of the motive power required to move the vehicle from the hybrid power system. In certain embodiments, the motive power system output data 626 further includes power drawn from the hybrid power system to operate other vehicle features, including for example idling power, cab environment conditioning power, etc.

In certain embodiments, the workload definition module 602 further interprets the duty cycle data 614 in response to global positioning satellite (GPS) data 624. An example workload definition module 602 further interprets the duty cycle data 614 in response to stored route data and/or stored geographical data. In certain embodiments, the workload definition module 602 compares stored route data to present operations, either hybrid power system output values, or current positioning values from the GPS, to determine upcoming likely duty cycle data 614. In certain embodiments, the workload definition module 602 compares stored geographical data to a current positioning value from the GPS, and/or a current travel direction, to determine upcoming likely duty cycle data 614.

In certain embodiments, the workload definition module 602 interprets the duty cycle data 614 by performing a frequency component analysis 628 of the GPS data 624, the motive power system output data 626, and/or driveline load data. The frequency component analysis 628 may be any type of frequency component analysis known in the art, including for example a fast Fourier transform (FFT). As is known in the art, the frequency component analysis 628 produces a number of amplitude peaks each corresponding to a particular frequency. An example analysis 628 provides a number of load amplitudes each corresponding to a frequency of the load amplitude produced. Amplitude values from the analysis 628 may represent torque output values, power output values, altitude variation values, or output values for any other load related parameter. In certain embodiments, the workload definition module 602 provides a largest amplitude 630 from the frequency component analysis 628.

An example workload definition module 602 interprets a boundary condition 620. The boundary condition 620 includes any parameter known in the art that provides a convergence limit for analysis, or any parameter that is otherwise desired or required for an acceptable solution set of load response operating conditions 616. Example and non-limiting boundary conditions 620 include a battery state-of-charge (SOC) minimum, a battery SOC maximum, an energy accumulator SOC minimum, an energy accumulator SOC maximum, a maximum speed, a time-to-destination value, a minimum speed, and/or an estimated driving route. The estimated driving route includes a driving time, distance, route trajectory of loads and/or altitude values, and/or any other values providing a route definition over which load response operating conditions 616 may have relative efficiency values determined.

The workload definition module 602 interprets an optimization criterion 622. The optimization criterion 622 includes any parameter or parameters selected that relate to or define operational efficiency for the hybrid power system. Example and non-limiting optimization criterion 622 include internal combustion engine output distance from an optimal torque value, an internal combustion engine output distance from an optimal torque trajectory, a total system fuel economy, an internal combustion engine motive fuel economy, a battery incremental service life value, and/or a battery state-of-health incremental value. The optimization criterion 622 may be evaluated at each operating point of the system, and/or integrated or otherwise aggregated over the entire defined operating range, e.g. over the range defined by the boundary condition 620.

Figure 8:
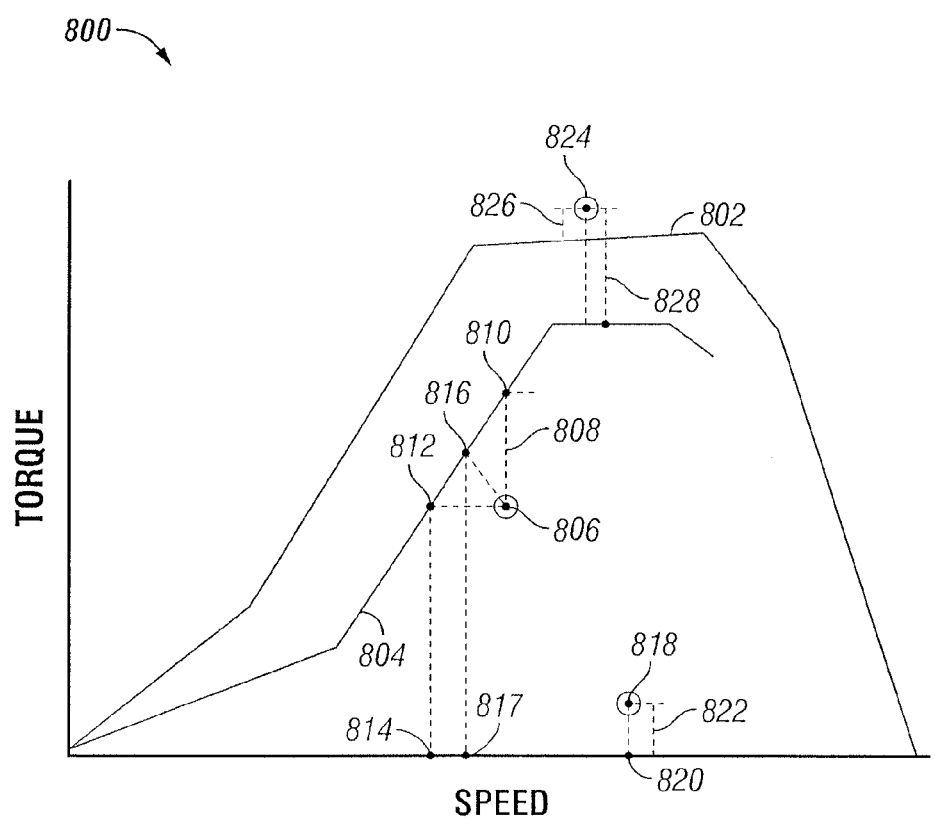
FIG. 8 is an illustration depicting an example optimal torque trajectory.

Referencing FIG. 8, a first operating point 806 is an example of an operating point including a torque value and a speed value according to one of the points indicated from the duty cycle data 614. In the example of FIG. 8, an internal combustion engine torque curve 802 is illustrated, and an example optimal torque trajectory 804 is illustrated. The optimal torque trajectory 804 may be determined from brake specific fuel consumption values, or according to any other desired criteria. The example of FIG. 8 shows an internal combustion engine output distance 808 from an optimal torque value 810. The example of FIG. 8 also shows illustrative internal combustion engine output distances 808, 812, 816 from the optimal torque trajectory 804. The distance 816 illustrates a shortest distance to the optimal torque trajectory 804, which may be a geometrically shortest distance, a distance proportioned in the torque or speed dimension, and/or a distance along a constant power output line. The distance 812 is the distance to the optimal torque trajectory 804 along a constant torque line.

The optimization criterion 622 may be a threshold value and/or an optimizable value. For example, the optimization criterion 622 may include a value that, if met, does not provide further optimization benefit. In one example, a time to destination value may be a value which is a target value but which, if met, is not calculated to provide further benefit for the purposes of further adjustment to the load response operating condition 616. In another example, the optimization criteria 622 includes an optimizable value which may be improved to the extent available within the operating space of the load response operating conditions 616, and/or within the available computation time. In one example, a fuel efficiency value may be a value which is improveable to the extent available within the operating space of the load response operating conditions 616, and/or within the available computation time.

An example controller 120 includes an operator interface module 612 that interprets an operator optimizing input 648, where the workload definition module 602 further interprets the optimization criterion 622 in response to an operator optimizing input 648. The inclusion of an operator interface module 612 provides an interface for an operator to provide the optimization criterion 622. The operator may be a vehicle operator, a fleet owner, an original equipment manufacturer, etc.

The controller 120 further includes an efficiency strategy module 604 that elects a load response operating condition 616 in response to the duty cycle data 614, the boundary condition 620, and the optimization criterion 622. The load response operating condition 616 is a parameter or selection that controls the load response of the hybrid power system. Example and non-limiting load response operating conditions 616 include a power division between the engine 102 and the non-combustion motive power 104 source, a state-of-charge (SOC) for a battery or other energy accumulator, speed targets for the vehicle, and/or any other load affecting parameter determined in response to the boundary condition(s) 620, the optimization criterion 622, and the duty cycle data 614.

In certain embodiments, the load response operating condition(s) 616 are determined according to the lowest fuel economy solution, or other optimization criterion 622, according to a model or simulation of the duty cycle data 614. The model or simulation of the duty cycle data 614 may be performed utilizing friction, air resistance, rolling resistance, and other considerations. An example model or simulation of the duty cycle data 614 includes utilizing equations such as equations 1 through 6 preceding, which may be utilized in conjunction with frequency and amplitude data from a frequency component analysis 628. In certain further embodiments, an amplitude and frequency are selected from the largest amplitude 630 from the frequency component analysis 628. The selected solution of the model or simulation is constrained by the boundary condition(s) 620.

In certain embodiments, the efficiency strategy module 604 further determines an operator behavior recommendation 650 in response to the duty cycle data 614, the boundary condition 620, and the optimization criterion 622. The example controller 120 further includes an operator interface module 612 that provides the operator behavior recommendation 650 to an output device. The operator behavior recommendation 650 includes any parameter provideable as a motive power source operation adjustment 618, including at least a speed target for the vehicle. Example output devices include a dashboard device, a driver report, a communication to a handheld or mobile device, a datalink communication, and/or a stored value accessible on a network in communication with the controller 120. Without limitation, intended recipients of the operator behavior recommendation 650 include a vehicle operator, a vehicle operator supervisor, a fleet dispatcher, a fleet owner or manager, an engine manufacturer, a vehicle manufacturer, and/or an original equipment manufacturer.

The controller 120 further includes an efficiency implementation module 606 that adjusts operation of at least one motive power source of the motive power system in response to the operating condition 616. An example efficiency implementation module 606 provides a motive power source operation adjustment 618 to adjust the operation of the at least one motive power source. In certain embodiments, the efficiency implementation module 606 adjusts the operation of the engine and/or a non-combustion motive power source in response to a largest amplitude 630 of a frequency component of the frequency component analysis 628. Example adjustments of the operation of the engine and/or the non-combustion motive power source include a target speed change, a governor droop adjustment, an engine/motor output apportionment adjustment, a battery SOC target adjustment, an energy accumulator SOC target adjustment, an engine torque limit, and a transmission gear ratio command.

A governor droop adjustment includes a change in a controlled speed of the engine or vehicle, and/or a change in a controlled torque output of the engine, without a change in the underlying target speed of the governor. For example, a cruise control governor may allow the controlled speed of the vehicle to be reduced slightly when the vehicle is climbing a hill, and to be increased slightly when the vehicle is going down a hill. In certain embodiments, the droop values of the governor may be increased or decreased relative to a baseline droop value in response to the determinations of the efficiency strategy module 604. In certain embodiments, increased fuel efficiency is realized with larger droop values, while a boundary condition 620 (e.g. a maximum vehicle speed, a maximum battery SOC, etc.) may constrain the droop values below the maximum fuel efficiency values. Any type of governor (engine speed, vehicle speed, torque output, etc.) and any type of droop value may be subject to adjustment in response to the load response operating condition 616.

In certain embodiments, a change in engine speed will yield improved efficiency according to the optimization criterion 622. For example, referencing FIG. 8, at the operating point 806, an engine speed adjustment down to the speed 814, without a change in torque, moves the engine operating point to the position 812 which lies on the optimal torque curve 804. The engine movement from the speed corresponding to operating point 806 to the speed 814 may not be available, for example due to constraints with regard to vehicle speed and/or available transmission ratios.

In certain embodiments, a partial move toward the optimal torque curve 804 may be performed, along the engine speed and/or engine torque axis. For example, operating point 816 may be available, corresponding to engine speed 817. Where excess power is developed, for example by increasing engine torque to operating point 810 along the same engine speed, the energy accumulation device may store the excess power, subject to the storage constraints of the energy accumulation device. The availability of engine movement from the operating point 806 is determined by the efficiency strategy module 604. In certain embodiments, the efficiency implementation module provides a motive power source operation adjustment 618 that is a transmission gear ratio command to implement the movement from the operating point 806.

An example efficiency implementation module 606 includes adjusting the operation of the engine and/or the motive power source in response to a largest amplitude 630 of a frequency component of the frequency component analysis 628. An example efficiency strategy module 604 determines an energy requirement 632 of the energy storage system in response to the largest amplitude 630. For example, the largest amplitude 630 can be correlated to an amount of time the vehicle motive power requirement is greater than the engine maximum power deliverability, and/or greater than the engine optimal power deliverability (e.g. determined from the optimal torque curve 804), and the efficiency strategy module 604 determines an energy requirement 632 that is an energy accumulation device drain amount. Additionally or alternatively, the largest amplitude 630 can be correlated to an amount of time the vehicle motive power requirement is below the engine optimal power deliverability, and the efficiency strategy module 604 determines an energy requirement 632 that is an energy accumulation device storage amount. In certain further embodiments, the efficiency strategy module 604 compares the energy requirement 632 to a usable energy value 634 (e.g. a battery that utilizes only a fraction of the total charge capacity to avoid degradation, such a battery kept between 60% and 80% charged).

Where the usable energy value 634 is below the energy requirement 632, operational modification of the motive power sources may be adjusted to reduce the energy requirement 632 (e.g. reduce vehicle speed, increase the engine portion of the produced motive power, etc.) and/or a higher capacity energy accumulation device may be indicated. Where the usable energy value 634 is greater than the energy requirement 632, the energy accumulation device is sufficiently sized, and/or greater optimization within the constraints of the boundary condition(s) 620 may be available. Accordingly, in certain embodiments, the efficiency implementation module 606 adjusts the operation of the engine and/or the motive power source in response to comparing a usable energy value 634 of the energy storage system to the energy requirement 632.

In certain embodiments, the controller 120 includes an aftertreatment response module 608 that interprets an aftertreatment regeneration condition 638, and the efficiency strategy module 604 further elects the load response condition 616 in response to the aftertreatment regeneration condition 638. An example efficiency strategy module 604 elects a load condition response 616, such that the efficiency implementation module 606 provides an aftertreatment command 636 that delays an aftertreatment regeneration operation in response to an impending motive power system output increase 640. For example, where the aftertreatment regeneration condition 638 indicates that a thermally based aftertreatment regeneration event is desired, and the duty cycle data 614 (e.g. including GPS data 624) indicates an impending motive power system output increase 640, an example efficiency strategy module 604 delays the nominal triggering of the aftertreatment regeneration event to take advantage of the upcoming load-induced temperature increase of the aftertreatment system.

An example controller 120 includes a cooling component response module 610 that interprets a cooling condition 642. An example efficiency strategy module 604 elects the load response condition 616 in response to the cooling condition 642. For example, a cooling condition 642 indicates that a supplemental cooling device is required or imminently required (e.g. operation of fan), and the duty cycle data 614 indicates that an impending motive power system output decrease 646 is present. In the example, an efficiency strategy module 604 provides a load response operating condition 616 such that the efficiency implementation module 606 provides a cooling command 644 to delay operation of the supplemental cooling device to take advantage of the upcoming load-induced temperature decrease of the engine coolant.

An example apparatus 700 includes a controller 701 having a duty cycle description module 702 that interprets a powertrain load variation amplitude 708 and an internal combustion engine output profile 716. In certain embodiments, the powertrain load variation amplitude 708 is determined according to defined or recorded duty cycle data for motive power for a vehicle. In certain embodiments, the powertrain load variation amplitude 708 is determined from frequency component analysis 710 of a motive power output requirement 714, from load data, from GPS data, and/or from vehicle route data. In certain embodiments, the powertrain load variation amplitude 708 is determined from one or more of the largest amplitudes 712 from the frequency component analysis 710. The controller 701 further includes an optimization opportunity module 704 that determines an engine output differential 726 in response to the powertrain load variation amplitude 708 and the internal combustion engine output profile 716. In certain embodiments, the controller 701 further includes a hybrid planning module 706 that provides an energy accumulator sizing parameter 718 and/or an alternate motive power provider sizing parameter 720 in response to the engine output differential 726.

In certain embodiments, the optimization opportunity module 704 further determines the engine output differential 726 in response to a difference between a motive power output requirement 714 and a target engine power output 722 and/or a maximum engine power output 724. For example, referencing FIG. 8, at the operating point 824, the motive power output requirement 714 is greater than both the maximum engine power output 724 (e.g. along the torque curve 802) and the target engine power output 722 (e.g. along the optimal engine torque curve 804). Accordingly, the engine output differential 726 may be either the distance 826 to the maximum engine power output 724 or the distance 828 to the target engine power output 722. The distances 826, 828 are the shortest distances to the operating point 824, and are along isochronous lines. However, the distances may be measured by other criteria, including for example along constant power lines or according to any other desired criteria.

The engine output differential 726 provides a value for determining the contributions of the non-combustion portion of the hybrid power system. In one example, the absolute power contribution required (e.g. from the size of the engine output differential 726) assists in determining the alternate motive power provider sizing parameter 720. The energy accumulation required (e.g. from the integrated engine output differential 726 over a period determined with reference to the powertrain load variation amplitude 708) assists in determining the energy accumulator sizing parameter 718. The engine output differential 726 may be a positive or negative value, in that any sign convention may be utilized, and also in that the motive power output requirement 714 being greater than the target engine power output 722 or the maximum engine power output 724 may have a first sign value, and the motive power output requirement 714 being less than the target engine power output 722 or the maximum engine power output 724 may have a second sign value.

An example hybrid planning module 706 adjusts the target engine power output 722, providing an adjusted target engine power output 728, in response to the target engine power output 722 exceeding the motive power output requirement 714. For example, referencing FIG. 8, at operating point 806 the motive power output requirement 714 is below the target engine power output 722. An example hybrid planning module 706 adjusts the target engine power output 722 to operating point 810 (isochronous), operating point 816 (approximately constant power), operating point 812 (constant torque), or some other selected operating point. In the example referencing FIG. 8, another example hybrid planning module 706 adjusts the target engine power output 722 by changing an engine rating such that an updated internal combustion engine output profile 716 provides an optimal torque curve 804 that falls on the operating point 806 (e.g. identifying that a presently designed engine rating may be greater than is required for the planned duty cycle of the vehicle). Additionally or alternatively, the hybrid planning module 706 may provide a transmission request for a transmission change or update having a gear ratio that moves one or more operating points from the planned duty cycle closer to the optimal torque curve 804.

An example optimization opportunity module 704 includes providing the engine output differential 726 including the entire motive power output requirement 714 in response to an operating condition where the target engine power output 722 exceeds the motive power output requirement 714. For example, referencing FIG. 8 at operating point 818, the motive power output requirement 714 is below the optimal torque curve 804. An example optimization opportunity module 704 provides the engine output differential 726 as the distance 822 to an engine power level of zero, i.e. provides the engine output differential 726 as the entire motive power output requirement 714. Accordingly, at the operating point 818, operating at engine speed 820, fueling is stopped in the engine and the entire motive power is provided by the alternative non-engine motive power source. In certain embodiments, the entire motive power is provided by the alternative non-engine motive power source even where the motive power output requirement 714 is equal to or exceeds the target engine power output 722, such as at low engine speeds where an alternative non-engine motive power source is fully capable of providing the full motive power, and where sufficient energy accumulation is available.

In certain embodiments, the alternate motive power provider sizing parameter 720 includes a power rating of an electric motor and/or a hydraulic motor. An example engine output differential 726 includes an accumulated motive energy value, for example an integrated difference between an operating point 806 and the optimal torque curve 804 over a period of time. In certain embodiments, the energy accumulator sizing parameter 718 includes a stored energy rating, and/or a usable stored energy rating, of an energy accumulation device. An example apparatus includes the energy accumulation device being an electric battery, a hydraulic accumulator, a flywheel, a compressed fluid reservoir, and/or a hypercapacitor.

An example system includes a controller structured to perform operations to interpret an internal combustion engine performance definition. The internal combustion engine performance definition includes information sufficient to model engine torque and speed performance against a duty cycle description, and in certain embodiments includes an engine torque curve and/or an engine optimal torque curve. The example controller performs a frequency component analysis of a load description of a motive power system including the internal combustion engine to interpret a powertrain load variation amplitude for the motive power system. The controller determines an engine output differential in response to the powertrain load variation amplitude and the internal combustion engine performance definition. The controller further provides an energy accumulator sizing parameter in response to the engine output differential.

The system further includes a vehicle motively coupled to the motive power system, the motive power system including a non-combustion motive power source coupled to an energy accumulator, where the energy accumulator is sized in response to the energy accumulator sizing parameter. An example system further includes the motive power system having an electric motor, where the energy accumulator includes a battery. Another example system includes the powertrain load variation amplitude being a largest amplitude from the frequency component analysis. Yet another example system includes the load description of the motive power system being vehicle altitude data and/or motive power system output data. Yet another example system includes the controller further determining a rating of the non-combustion motive power source in response to the engine output differential, where the non-combustion motive power source is sized in response to the rating of the non-combustion motive power source. In certain embodiments, the vehicle is a vehicle having a gross vehicle weight rating greater than 26,000 pounds.

The schematic flow descriptions which follow provides illustrative embodiments of performing procedures for improving a hybrid power system efficiency. Operations illustrated are understood to be exemplary only, and operations may be combined or divided, and added or removed, as well as re-ordered in whole or part, unless stated explicitly to the contrary herein. Certain operations illustrated may be implemented by a computer executing a computer program product on a computer readable medium, where the computer program product comprises instructions causing the computer to execute one or more of the operations, or to issue commands to other devices to execute one or more of the operations.

An example procedure includes an operation to interpret duty cycle data for a motive power system for a vehicle having a plurality of motive power sources, an operation to interpret a boundary condition, and an operation to interpret an optimization criterion. The procedure further includes an operation to elect a load response condition in response to the duty cycle data, the boundary condition, and the optimization criterion. The procedure still further includes an operation to adjust the operations of at least one of the motive power sources in response to the load response condition.

An example procedure further includes an operation to interpret the duty cycle data by performing a frequency component analysis on global positioning satellite (GPS) data and/or motive power system output data. Another example procedure includes an operation to interpret the duty cycle data by performing a frequency component analysis of vehicle altitude data. Example operations to adjust the operation of one of the motive power sources include changing a target speed, adjusting a governor droop, adjusting a motive power system output apportionment between the number of motive power sources, adjusting a battery SOC target, adjusting an energy accumulator SOC target, adjusting an engine torque limit, and commanding a transmission gear ratio change.

Another example operation includes interpreting the boundary condition by performing at least one of the operations including determining a battery state-of-charge (SOC) minimum, determining a battery SOC maximum, determining an energy accumulator SOC minimum, determining an energy accumulator SOC maximum, determining a maximum speed, determining a time-to-destination value, determining a minimum speed, and/or determining an estimated driving route. Another example operation includes interpreting the optimization criterion by performing at least one of the operations including determining an internal combustion engine output distance from an optimal torque value, determining an internal combustion engine output distance from an optimal torque trajectory, determining a total system fuel economy, determining an internal combustion engine motive fuel economy, determining a battery incremental service life value, and/or interpreting an operator input. The operations in the example procedure may be performed in real-time on a vehicle during operations, and/or may be performed in simulated conditions.

Yet another procedure includes an operation to interpret a powertrain load variation amplitude and an internal combustion engine output profile. The procedure includes an operation to determine an engine output differential in response to the powertrain load variation amplitude and the internal combustion engine output profile, and an operation to provide an energy accumulator sizing parameter and/or an alternate motive power provider sizing parameter in response to the engine output differential. In certain embodiments, the operation to interpret the powertrain load variation amplitude includes performing a frequency component analysis of a load description. An example operation to perform the frequency component analysis of the load description includes utilizing real-time vehicle data. An example operation includes providing the energy accumulator sizing parameter to an output device.

In certain embodiments, the engine output differential includes an engine power deficiency. An example engine power deficiency includes a difference between a motive power output requirement and a target engine power output. In certain embodiments, the engine power deficiency includes an accumulated motive energy value. In certain embodiments, the energy accumulator sizing parameter includes a stored energy rating of an energy accumulation device. The operations of the example procedure may be performed at design time, for example from a simulation, a test vehicle, a prior generation vehicle, and/or a vehicle operating on a duty cycle route consistent with or related to a vehicle for which the hybrid power system is being designed. Additionally or alternatively, the operations of the example procedure may be performed in real-time on a first vehicle, and stored or communicated for later use in a subsequent vehicle and/or in an upgrade of the first vehicle.

It is evident from the figures and text presented above, a variety of embodiments according to the present disclosure are contemplated.

One aspect of the present invention includes a driveline load management system with a hybrid drive system including a fuel-driven motive power source, a nonfuel-driven motive power source, and an energy storage system; and a controller structured to receive a route duty cycle data; determine an anticipated driveline load duty cycle in response to the route duty data; select an operating condition in response to the anticipated driveline load duty cycle; and provide an operating parameter in response to the current operating mode.

Features of this aspect of the present invention include the hybrid drive system having an operator preference and the operator interface being structured to provide an indication to an operator in response to the current operating mode. The indication provided to the operator may include a communication selected from a group consisting of preliminary operator behavior, suggested behavior modifications, operator preference feedback, and combinations thereof. The current operating condition may include a mode selected from a group consisting of energy capture, energy return, energy capture and return, and combinations thereof. The route duty cycle data further includes an operator interface data, a geographical position data, a past duty cycle data, and an operating condition data.

In a further feature of this aspect of the present invention, the current operating condition may further include: a regenerative brake operation where the anticipated driveline load duty cycle is an energy capture event; a preparation operation in which the anticipated driveline load duty cycle is an energy return event and initiating further includes reducing a first torque contribution from the fuel driven motive power source to a driveline torque, supplying the electrical motive power source with a quantity of energy from an energy storage system and supplementing the driveline torque with a second torque contribution from the nonfuel-driven motive power source; a boost operation in which the anticipated driveline load duty cycle is an energy return event and initiating further includes supplementing a driveline torque with a torque contribution from the nonfuel-driven motive power source; a start-stop operation in which the anticipated driveline load duty cycle is an energy capture and return module and initiating further includes alternating between a capture mode of regenerative braking operation and a return mode of supplementing a driveline torque with a torque contribution from the non-fuel-driven motive power source; and a speed regulation operation in which the anticipated driveline load duty cycle is an energy capture and return module and initiating further includes operating a regenerative braking operation, operating a boost operation and allowing for small deviations from a target speed range.

Another aspect of the present invention is a method including operating a hybrid drive system including a fuel-driven motive power source, an electrical motive power source, an energy storage system, and a controller; receiving an operator interface data, a geographical position data, an past duty cycle data, and an operating conditions data; interpreting an operator preference; determining an anticipated energy event in response to the geographical position data and the past duty cycle data; and initiating an operating condition in response to the anticipated energy event, the operating conditions data and the operator preference.

Features of this aspect of the present invention include the anticipated energy event being an anticipated kinetic energy capture event and the current operating mode is an electrical energy storage mode or an energy supply mode. A further feature includes the electrical energy storage mode converting a quantity of kinetic energy captured during the anticipated kinetic energy capture event into a quantity of electrical energy; and storing the quantity of electrical energy in the energy storage system. Yet a further feature includes the energy supply mode supplying a quantity of energy from the energy storage system to the electrical motive power source where the electrical motor power source converts the quantity of energy from the energy storage system into a quantity of kinetic energy to be supplied to a drivetrain of a hybrid vehicle.

Yet another aspect of the present invention is a method including operating a hybrid drive system including a fuel-driven motive power source, an electrical motive power source, an energy storage system, and a controller; forecasting a first current duty cycle in response to an operating conditions data; anticipating a future duty cycle in response to a geographical position data and a past duty cycle data; operating the hybrid drive system in response to the first current duty cycle and the future duty cycle; and monitoring a second current duty cycle in response to operation of the hybrid drive system.

An example set of embodiments is a system including a hybrid drive system including an internal combustion engine and a non-combustion motive power source. The system includes an energy storage system and a controller structured to functionally execute operations to improve the efficiency of the hybrid drive system. The controller interprets duty cycle data, a boundary condition, and an optimization criterion. The controller elects a load response operating condition in response to the duty cycle data, the boundary condition, and the optimization criterion. The controller further adjusts operations of the engine and/or the motive power source in response to the operating condition.

In a further example the controller interprets the duty cycle data by performing a frequency component analysis of driveline load data. An example includes adjusting the operation of the engine and/or the motive power source in response to a largest amplitude of a frequency component of the frequency component analysis. A still further example includes the controller determining an energy requirement of the energy storage system in response to the largest amplitude, and adjusting the operation of the engine and/or the motive power source in response to comparing a usable energy value of the energy storage system to the energy requirement.

An example system includes the boundary conditions being a battery state-of-charge (SOC) minimum, a battery SOC maximum, an energy accumulator SOC minimum, an energy accumulator SOC maximum, a maximum speed, a time-to-destination value, a minimum speed, and/or an estimated driving route. Another example system includes the optimization criterion being an internal combustion engine output distance from an optimal torque value, an internal combustion engine output distance from an optimal torque trajectory, a total system fuel economy, an internal combustion engine motive fuel economy, a battery incremental service life value, and/or a battery state-of-health incremental value.

In certain embodiments, the controller interprets the optimization criterion in response to an operator input. Example adjustments of the operation of the engine and/or the motive power source include a target speed change, a governor droop adjustment, an engine/motor output apportionment adjustment, a battery SOC target adjustment, an engine torque limit, and a transmission gear ratio command. An example system includes the motive power source being an electric motor, and the energy storage system being a battery and/or a hypercapacitor. Another example system includes the motive power source being a hydraulic motor, and the energy storage system including a hydraulic accumulator and/or a flywheel. In certain embodiments, the system includes a vehicle having a gross vehicle weight rating that exceeds 26,000 pounds, where the engine and the motive power source are motively coupled to the vehicle. In certain embodiments, the system includes at least one clutch that selectively couples the engine and/or the motive power source to the vehicle, the coupling being either individually or in conjunction.

In certain embodiments, the controller interprets the duty cycle data in response to GPS data. An example controller further interprets the duty cycle data in response to stored route data and/or stored geographical data.

Another exemplary set of embodiments is an apparatus including a workload definition module that interprets duty cycle data for a motive power system for a vehicle having a plurality of motive power sources, that interprets a boundary condition, and that interprets an optimization criterion. The apparatus further includes an efficiency strategy module that elects a load response operating condition in response to the duty cycle data, the boundary condition, and the optimization criterion. The apparatus further includes an efficiency implementation module that adjusts operation of at least one motive power source of the motive power system in response to the operating condition.

An example apparatus further includes the workload definition module interpreting the duty cycle data by performing a frequency component analysis of at least one of global positioning satellite (GPS) data and motive power system output data. An example apparatus further includes the efficiency implementation module further adjusting the operation of the engine and/or the motive power source in response to a largest amplitude of a frequency component of the frequency component analysis. In certain embodiments, the apparatus includes an energy storage system operationally coupled to at least one of the motive power sources, where the efficiency strategy module further determines an energy requirement of the energy storage system in response to the largest amplitude, and adjusts the operation of the at least one of the motive power sources in response to comparing a usable energy value of the energy storage system to the energy requirement. In certain embodiments, the motive power system output data includes power output data and/or torque output data.

An example apparatus includes the workload definition module further interpreting the duty cycle data in response to global positioning satellite (GPS) data, and/or further in response to stored route data and/or stored geographical data. An example apparatus further includes an aftertreatment response module that interprets an aftertreatment regeneration condition, where the efficiency strategy module further elects the load response condition in response to the aftertreatment regeneration condition. A further example apparatus includes efficiency strategy module delaying an aftertreatment regeneration operation in response to an impending motive power system output increase.

Another example apparatus includes a cooling component response module that interprets a cooling condition, where the efficiency strategy module further elects the load response condition in response to the cooling condition. In a further embodiment, the efficiency strategy module prevents a fan engagement event in response to an impending motive power system output decrease.

An example apparatus includes an operator interface module that interprets an operator optimizing input, where the workload definition module further interprets the optimization criterion in response to an operator optimizing input. Another example apparatus includes the efficiency strategy module further determining an operator behavior recommendation in response to the duty cycle data, the boundary condition, and the optimization criterion, where the apparatus further includes an operator interface module that provides the operator behavior recommendation to an output device.

Yet another set of embodiments is a method including interpreting duty cycle data for a motive power system for a vehicle having a plurality of motive power sources, interpreting a boundary condition, and interpreting an optimization criterion. The method further includes electing a load response condition in response to the duty cycle data, the boundary condition, and the optimization criterion. The method still further includes adjusting operations of at least one of the motive power sources in response to the load response condition.

An example method further includes interpreting the duty cycle data by performing a frequency component analysis on global positioning satellite (GPS) data and/or motive power system output data. Another example method includes interpreting the duty cycle data by performing a frequency component analysis of vehicle altitude data. Yet another example method includes adjusting the operations of one of the motive power sources by changing a target speed, adjusting a governor droop, adjusting a motive power system output apportionment between the plurality of motive power sources, adjusting a battery SOC target, adjusting an energy accumulator SOC target, adjusting an engine torque limit, and commanding a transmission gear ratio change.

Another example method includes interpreting the boundary condition by performing at least one of the operations including determining a battery state-of-charge (SOC) minimum, determining a battery SOC maximum, determining an energy accumulator SOC minimum, determining an energy accumulator SOC maximum, determining a maximum speed, determining a time-to-destination value, determining a minimum speed, and/or determining an estimated driving route. Another example method includes interpreting the optimization criterion by performing at least one of the operations including determining an internal combustion engine output distance from an optimal torque value, determining an internal combustion engine output distance from an optimal torque trajectory, determining a total system fuel economy, determining an internal combustion engine motive fuel economy, determining a battery incremental service life value, and/or interpreting an operator input.

Yet another example set of embodiments is a method including interpreting a powertrain load variation amplitude and an internal combustion engine output profile. The method includes determining an engine output differential in response to the powertrain load variation amplitude and the internal combustion engine output profile, and providing an energy accumulator sizing parameter and/or an alternate motive power provider sizing parameter in response to the engine output differential. In certain embodiments, interpreting the powertrain load variation amplitude includes performing a frequency component analysis of a load description. An example operation to perform the frequency component analysis of the load description includes utilizing real-time vehicle data. An example method includes providing the energy accumulator sizing parameter to an output device.

In certain embodiments, the engine output differential includes an engine power deficiency. An example engine power deficiency includes a difference between a motive power output requirement and a target engine power output. In certain embodiments, the engine power deficiency includes an accumulated motive energy value. In certain embodiments, the energy accumulator sizing parameter includes a stored energy rating of an energy accumulation device.

Another example set of embodiments is an apparatus including a duty cycle description module that interprets a powertrain load variation amplitude and an internal combustion engine output profile. The apparatus further includes an optimization opportunity module that determines an engine output differential in response to the powertrain load variation amplitude and the internal combustion engine output profile, and a hybrid planning module that provides an energy accumulator sizing parameter and/or an alternate motive power provider sizing parameter in response to the engine output differential.

In certain embodiments, the optimization opportunity module further determines the engine output differential in response to a difference between a motive power output requirement and a target engine power output and/or a maximum engine power output. An example hybrid planning module further adjusts the target engine power output in response to the target engine power output exceeding the motive power output requirement.

An example apparatus includes the engine output differential including the entire motive power output requirement at an operating condition where the target engine power output exceeds the motive power output requirement. In certain embodiments, the alternate motive power provider sizing includes a power rating of an electric motor and/or a hydraulic motor. An example engine output differential includes an accumulated motive energy value. In certain embodiments, the energy accumulator sizing parameter includes a stored energy rating of an energy accumulation device. An example apparatus includes the energy accumulation device being an electric battery, a hydraulic accumulator, a flywheel, a compressed fluid reservoir, and/or a hypercapacitor.

Yet another exemplary set of embodiments is a system including a controller that interprets an internal combustion engine performance definition, performs a frequency component analysis of a load description of a motive power system including the internal combustion engine to interpret a powertrain load variation amplitude for the motive power system, and that determines an engine output differential in response to the powertrain load variation amplitude and the internal combustion engine performance definition. The controller further provides an energy accumulator sizing parameter in response to the engine output differential. The system further includes a vehicle motively coupled to the motive power system, the motive power system including a non-combustion motive power source coupled to an energy accumulator, where the energy accumulator is sized in response to the energy accumulator sizing parameter. An example system further includes the motive power system having an electric motor, where the energy accumulator includes a battery. Another example system includes the powertrain load variation amplitude being a largest amplitude from the frequency component analysis. Yet another example system includes the load description of the motive power system being one vehicle altitude data and/or motive power system output data. Yet another example system includes the controller further determining a rating of the non-combustion motive power source in response to the engine output differential, where the non-combustion motive power source is sized in response to the rating of the non-combustion motive power source. In certain embodiments, the vehicle is a vehicle having a gross vehicle weight rating greater than 26,000 pounds.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A system comprising:
 a hybrid drive system including an internal combustion engine and a non-combustion motive power source;
 an energy storage system;
 a controller structured to:
  interpret duty cycle data including at least one of power output data and torque output data for a load on the hybrid drive system over an operating period, a boundary condition for at least one parameter associated with an acceptable set of load response operating conditions, and an optimization criterion that defines an operational efficiency of the hybrid drive system, wherein the duty cycle data is interpreted by performing a frequency component analysis of the at least one of the power output data and the torque output data to determine a largest load amplitude thereof from a number of load amplitude peaks each corresponding to a particular frequency, wherein the largest load amplitude is correlated to an amount of time that a motive power requirement is greater than a power deliverability of the engine;
  elect a load response operating condition that includes a power division description between the internal combustion engine and the non-combustion motive power source in response to the largest load amplitude from the frequency component analysis of the duty cycle data, the set of acceptable load response operating conditions associated with the boundary condition, and the optimization criterion; and
  adjust operation of at least one of the engine and the motive power source in response to the operating condition.

2. The system of claim 1, wherein the controller is further structured to determine an energy requirement of the energy storage system in response to the largest load amplitude, wherein the energy requirement is an energy accumulation device drain amount that is based on the amount of time, wherein the controller is structured to adjust the operation of the at least one of the engine and the motive power source in response to comparing a usable energy value of the energy storage system to the energy requirement.

3. The system of claim 1, wherein the boundary conditions comprises at least one parameter selected from the parameters consisting of: a battery state-of-charge (SOC) minimum, a battery SOC maximum, an energy accumulator SOC minimum, an energy accumulator SOC maximum, a maximum speed, a time-to-destination value, a minimum speed, and an estimated driving route.

4. The system of claim 1, wherein the optimization criterion comprises at least one parameter selected from the list of parameters consisting of: an internal combustion engine output distance from an optimal torque value, an internal combustion engine output distance from an optimal torque trajectory, a total system fuel economy, an internal combustion engine motive fuel economy, a battery incremental service life value, and a battery state of health incremental value.

5. The system of claim 1, wherein the controller is further structured to interpret the optimization criterion in response to an operator input.

6. The system of claim 1, wherein the adjusted operation of the one of the engine and the motive power source comprises at least one operation adjustment selected from the adjustments consisting of: a target speed change, a governor droop adjustment, an engine/motor output apportionment adjustment, a battery SOC target adjustment, an engine torque limit, and a transmission gear ratio command.

7. The system of claim 1, wherein the motive power source comprises an electric motor and wherein the energy storage system comprises at least one of a battery and a hyper-capacitor.

8. The system of claim 1, wherein the motive power source comprises a hydraulic motor and wherein the energy storage system comprises at least one of a hydraulic accumulator and a flywheel.

9. The system of claim 1, further comprising a vehicle having a gross vehicle weight rating exceeding 26,000 pounds, wherein the internal combustion engine and the motive power source are motively coupled to the vehicle.

10. The system of claim 9, further comprising at least one clutch structured to selectively couple the internal combustion engine and the motive power source to the vehicle, individually or in conjunction.

11. The system of claim 1, wherein the controller is further structured to interpret the duty cycle data in response to global positioning satellite (GPS) data.

12. The system of claim 11, wherein the controller is further structured to interpret the duty cycle data in response to one of stored route data and stored geographical data.

13. An apparatus, comprising:
 a workload definition module structured to interpret:
  duty cycle data for a motive power system for a vehicle having a plurality of motive power sources, and wherein the workload definition module is further structured to interpret the duty cycle data by performing a frequency component analysis of at least one of power output data and torque output data for a load on the motive power system output over an operating period to determine a largest load amplitude from a number of load amplitude peaks each corresponding to a particular frequency of the plurality of motive power sources, wherein the lamest load amplitude is correlated to an amount of time that a motive power requirement is greater than a power deliverability of one of the motive power sources;
  a boundary condition for at least one parameter associated with an acceptable set of load response operating conditions; and
  an optimization criterion that defines an operational efficiency of the motive power system;
 an efficiency strategy module structured to elect a load response operating condition that includes a power division description between the plurality of motive power sources in response to the largest load amplitude from the frequency component analysis of the duty cycle data, the set of acceptable load response operating conditions associated with the boundary condition, and the optimization criterion; and
 an efficiency implementation module structured to adjust operation of at least one motive power source of the motive power system in response to the load response operating condition, wherein each of the workload definition module, the efficiency strategy module, and the efficiency implementation module is implemented in at least one of hardware and a non-transitory computer readable medium.

14. The apparatus of claim 13, further comprising an energy storage system operationally coupled to at least one of the motive power sources, wherein the efficiency strategy module is further structured to determine an energy requirement of the energy storage system in response to the largest load amplitude, wherein the energy requirement is an energy accumulation device drain amount that is based on the amount of time, wherein the energy efficiency strategy module is structured to adjust the operation of the at least one of the motive power sources in response to comparing a usable energy value of the energy storage system to the energy requirement.

15. The apparatus of claim 13, wherein the workload definition module is further structured to interpret the duty cycle data in response to global positioning satellite (GPS) data.

16. The apparatus of claim 15, wherein the workload definition module is further structured to interpret the duty cycle data in response to one of stored route data and stored geographical data.

17. The apparatus of claim 16, further comprising an aftertreatment response module structured to interpret an aftertreatment regeneration condition, and wherein the efficiency strategy module is further structured to elect the load response condition in response to the aftertreatment regeneration condition, wherein the aftertreatment response module is implemented in at least one of hardware and a computer readable medium.

18. The apparatus of claim 17, wherein the efficiency strategy module is further structured to delay an aftertreatment regeneration operation in response to an impending motive power system output increase.

19. The apparatus of claim 16, further comprising a cooling component response module structured to interpret a cooling condition, and wherein the efficiency strategy module is further structured to elect the load response condition in response to the cooling condition, wherein the cooling component response module is implemented in at least one of hardware and a computer readable medium.

20. The apparatus of claim 19, wherein the efficiency strategy module is further structured prevent a fan engagement event in response to an impending motive power system output decrease.

21. The apparatus of claim 13, further comprising an operator interface module structured to interpret an operator optimizing input, and wherein the workload definition module is further structured to interpret the optimization criterion in response to an operator optimizing input, wherein the operator interface module is implemented in at least one of hardware and a computer readable medium.

22. The apparatus of claim 13, wherein the efficiency strategy module is further structured to determine an operator behavior recommendation in response to the duty cycle data, the boundary condition, and the optimization criterion, and wherein the apparatus further comprises an operator interface module structured to provide the operator behavior recommendation to an output device, wherein the operator interface module is implemented in at least one of hardware and a computer readable medium.

23. A method, comprising:
interpreting duty cycle data for a motive power system for a vehicle having a plurality of motive power sources, wherein the interpreting the duty cycle data comprises performing a frequency component analysis of at least one of power output data and torque output data for a load on the motive power system over an operating period to determine a largest load amplitude thereof from a number of load amplitude peaks each corresponding to a particular frequency, wherein the lamest load amplitude is correlated to an amount of time that a motive power requirement is greater than a power deliverability of one of the motive power sources;
interpreting a boundary condition associated with an acceptable set of load response operating conditions;
interpreting an optimization criterion that defines an operational efficiency of the motive power system;
electing a load response condition that includes a power division description between the plurality of motive power sources in response to the largest load amplitude from the frequency component analysis of the duty cycle data, the set of acceptable load response operating conditions associated with the boundary condition, and the optimization criterion; and
adjusting operations of at least one of the motive power sources in response to the load response condition.

24. The method of claim 23, further comprising performing the frequency component analysis on global positioning satellite (GPS) data.

25. The method of claim 23, further comprising performing the frequency component analysis of vehicle altitude data.

26. The method of claim 23, wherein the adjusting operations comprises performing at least one operation selected from the operations consisting of: changing a target speed, adjusting a governor droop, adjusting a motive power system output apportionment between the plurality of motive power sources, adjusting a battery SOC target, adjusting an energy accumulator SOC target, adjusting an engine torque limit, and commanding a transmission gear ratio change.

27. The method of claim 23, wherein the interpreting the boundary condition comprises performing at least one operation selected from the operations consisting of: determining a battery state-of-charge (SOC) minimum, determining a battery SOC maximum, determining an energy accumulator SOC minimum, determining an energy accumulator SOC maximum, determining a maximum speed, determining a time-to-destination value, determining a minimum speed, and determining an estimated driving route.

28. The method of claim 23, wherein the interpreting the optimization criterion comprises performing at least one operation selected from the operations consisting of: determining an internal combustion engine output distance from an optimal torque value, determining an internal combustion engine output distance from an optimal torque trajectory, determining a total system fuel economy, determining an internal combustion engine motive fuel economy, determining a battery incremental service life value, and interpreting an operator input.

29. The method of claim 23, further comprising an energy storage system operationally coupled to at least one of the motive power sources, wherein interpreting the optimization criterion includes determining an energy requirement of the energy storage system in response to the largest load amplitude, wherein the energy requirement is an energy accumulation device drain amount that is based on the amount of time, wherein adjusting operations includes adjusting operations of at least one of the motive power sources in response to comparing a usable energy value of the energy storage system to the energy requirement.

* * * * *